(12) United States Patent
Shobayashi

(10) Patent No.: US 8,117,405 B2
(45) Date of Patent: Feb. 14, 2012

(54) STORAGE CONTROL METHOD FOR MANAGING ACCESS ENVIRONMENT ENABLING HOST TO ACCESS DATA

(75) Inventor: Hiroyuki Shobayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/489,013

(22) Filed: Jun. 22, 2009

(65) Prior Publication Data

US 2009/0254630 A1    Oct. 8, 2009

Related U.S. Application Data

(63) Continuation of application No. 11/333,303, filed on Jan. 18, 2006, now abandoned.

(30) Foreign Application Priority Data

Nov. 4, 2005 (JP) ................................ 2005-321346

(51) Int. Cl.
*G06F 12/02* (2006.01)
(52) U.S. Cl. ................................ 711/154; 711/E12.002
(58) Field of Classification Search .......................... None
See application file for complete search history.

(56) References Cited

U.S. PATENT DOCUMENTS

| | | | |
|---|---|---|---|
| 7,100,016 | B2 | 8/2006 | Yamamoto et al. |
| 2001/0020254 | A1 | 9/2001 | Blumenau et al. |
| 2003/0149837 | A1 | 8/2003 | Coker et al. |
| 2004/0073648 | A1 | 4/2004 | Tanino et al. |
| 2005/0080810 | A1 | 4/2005 | Matsuura |
| 2005/0108235 | A1 | 5/2005 | Sato et al. |

FOREIGN PATENT DOCUMENTS

| | | |
|---|---|---|
| JP | 04-308917 | 10/1992 |
| JP | 07-175595 | 7/1995 |
| JP | 2004-088570 | 3/2004 |
| JP | 2005-115438 | 4/2005 |
| JP | 2005-149283 | 6/2005 |
| JP | 2005-182708 | 7/2005 |
| WO | WO 2005/071544 | 8/2005 |

*Primary Examiner* — Pierre-Michel Bataille
*Assistant Examiner* — Ryan Dare
(74) *Attorney, Agent, or Firm* — Antonelli, Terry, Stout & Kraus, LLP.

(57) ABSTRACT

A computer system wherein a first access environment program converts an application data created by the first application program, according to access environment information, and sends the converted application data to a first volume, wherein a management computer stores the access environment information, and relationship between the second volume and the access environment information, wherein, when the management computer receives a request to access the second volume from the second host computer, the management computer identifies the access environment information based on the relationship, and sends the access environment information to the second host computer, and wherein the second host computer configures a second access environment program stored in the second host computer based on the access environment information, and wherein and a second application program stored the second host computer, accesses to the second volume via the second access environment program configured by the access environment information.

6 Claims, 20 Drawing Sheets

FIG. 3

| HOST IDENTIFIER | HOST NAME | ADDRESS (IP ADDRESS) | OS | USABLE ACCESS COMPONENTS | | HBA-WWN |
|---|---|---|---|---|---|---|
| | | | | TYPE | NAME | |
| 001 | HOST A | 192.168.1.1 | Linux | BLOCK DEVICE | SCSI | 11...11 |
| | | | | SOFTWARE RAID | SoftwareRAID md | |
| | | | | LOGICAL VOLUME MANAGER | LVM PV | |
| | | | | LOGICAL VOLUME MANAGER | LVM VG | |
| | | | | LOGICAL VOLUME MANAGER | LVM LV | |
| | | | | FILE SYSTEM | ext2 | |
| | | | | FILE SYSTEM MOUNT POINT | ext2 | |
| 002 | HOST B | 192.168.1.2 | Windows | FILE SYSTEM | NTFS | 22...22 |
| 003 | HOST C | 192.168.1.3 | AIX | FILE SYSTEM | jfs | 33...33 |
| 004 | HOST D | 192.168.1.4 | Linux | BLOCK DEVICE | SCSI | 44...44 |
| | | | | SOFTWARE RAID | Software RAID md | |
| | | | | LOGICAL VOLUME MANAGER | LVM PV | |
| | | | | LOGICAL VOLUME MANAGER | LVM VG | |
| | | | | LOGICAL VOLUME MANAGER | LVM LV | |
| | | | | FILE SYSTEM | ext2 | |
| | | | | FILE SYSTEM MOUNT POINT | Ext2 | |

| ACCESS ENVIRONMENT IDENTIFIER | APPLICATION NAME | OS | ACCESS COMPONENT INFORMATION | | | | | APPLICATION INFORMATION | VOLUME INFORMATION (STORAGE SYSTEM IDENTIFIER/VOLUME IDENTIFIER) |
|---|---|---|---|---|---|---|---|---|---|
| | | | CONFIGURATION SEQUENCE | TYPE | NAME | INSTANCE NAME | OUTSIDE-VOLUME CONFIGURATION INFORMATION | | |
| 001 | SHARED DIRECTORY | Linux | 1 | BLOCK DEVICE | SCSI | /dev/sda | null | vi | STORAGE SYSTEM 1#03 |
| | | | 2 | LOGICAL VOLUME MANAGER | LVM PV | /dev/sda | null | | STORAGE SYSTEM 1#04 |
| | | | 3 | LOGICAL VOLUME MANAGER | LVM VG | /dev/vg | null | | |
| | | | 4 | LOGICAL VOLUME MANAGER | LVM LV | /dev/vg/1v | null | | |
| | | | 5 | FILESYSTEM | ext2 | /dev/vg/1v | null | | |
| | | | 6 | FILESYSTEM MOUNT POINT | ext2 | /mnt/fs | null | | |
| 002 | WEB SERVER DB | AIX | 1 | BLOCK DEVICE | SCSI | /dev/sdb | null | HiRDB | STORAGE SYSTEM 1#05 |
| | | | ...... | | | | | | |

FIG. 5

| STORAGE SYSTEM | CHA-Port | VOLUME IDENTIFIER | VOLUME DISCLOSURE INFORMATION ||
| --- | --- | --- | --- | --- |
| | | | CHA-Port | HBA-WWN |
| STORAGE SYSTEM 1 | CL1-g | #01 | CL1-g | 11...11 |
| | CL2-g | #02 | CL2-g | 11...11 |
| | CL3-g | | CL2-g | 22...22 |
| | CL4-g | | CL3-g | 33...33 |
| | | #03 | null | null |
| | | #04 | null | null |
| | | #05 | null | null |
| STORAGE SYSTEM 2 | CL1-g | #01 | null | null |
| | CL2-g | #02 | | |
| ..... | | | | |

| TYPE | NAME | SERVER AGENT COMMON COMMAND | HOST AGENT PROGRAM-EXECUTED PROCEDURE |
|---|---|---|---|
| HBA | ... | "VOLUME RECOGNITION COMMAND" | "UNIQUE VOLUME RECOGNITION COMMAND" |
| HBA | ... | "VOLUME INFORMATION ACQUISITION COMMAND" | "VOLUME INFORMATION ACQUISITION COMMAND" |
| KERNEL (DEVICE MANAGEMENT FUNCTION) | ... | "VOLUME RECOGNITION COMMAND" | "UNIQUE VOLUME RECOGNITION COMMAND" |
| KERNEL (DEVICE MANAGEMENT FUNCTION) | ... | "VOLUME INFORMATION ACQUISITION COMMAND" | "VOLUME INFORMATION ACQUISITION COMMAND" |
| BLOCK DEVICE | SCSI | "CREATION COMMAND" | "UNIQUE CREATION COMMAND" |
| BLOCK DEVICE | SCSI | "RESTORATION COMMAND" | "UNIQUE RESTORATION COMMAND" |
| BLOCK DEVICE | SCSI | "INFORMATION ACQUISITION COMMAND" | "UNIQUE INFORMATION ACQUISITION COMMAND" |
| BLOCK DEVICE | SCSI | "OUTSIDE-VOLUME CONFIGURATION INFORMATION ACQUISITION COMMAND" | "UNIQUE OUTSIDE-VOLUME CONFIGURATION INFORMATION ACQUISITION COMMAND" |
| LOGICAL VOLUME MANAGER | LVM PV | "CREATION COMMAND" | "UNIQUE CREATION COMMAND" |
| LOGICAL VOLUME MANAGER | LVM PV | "RESTORATION COMMAND" | "UNIQUE RESTORATION COMMAND" |
| LOGICAL VOLUME MANAGER | LVM PV | "INFORMATION ACQUISITION COMMAND" | "UNIQUE INFORMATION ACQUISITION COMMAND" |
| LOGICAL VOLUME MANAGER | LVM PV | "OUTSIDE-VOLUME CONFIGURATION INFORMATION ACQUISITION COMMAND" | "UNIQUE OUTSIDE-VOLUME CONFIGURATION INFORMATION ACQUISITION COMMAND" |
| LOGICAL VOLUME MANAGER | LVM VG | "CREATION COMMAND" | "UNIQUE CREATION COMMAND" |
| LOGICAL VOLUME MANAGER | LVM VG | "RESTORATION COMMAND" | "UNIQUE RESTORATION COMMAND" |
| LOGICAL VOLUME MANAGER | LVM VG | "INFORMATION ACQUISITION COMMAND" | "UNIQUE INFORMATION ACQUISITION COMMAND" |
| LOGICAL VOLUME MANAGER | LVM VG | "OUTSIDE-VOLUME CONFIGURATION INFORMATION ACQUISITION COMMAND" | "UNIQUE OUTSIDE-VOLUME CONFIGURATION INFORMATION ACQUISITION COMMAND" |
| LOGICAL VOLUME MANAGER | LVM LV | "CREATION COMMAND" | "UNIQUE CREATION COMMAND" |
| LOGICAL VOLUME MANAGER | LVM LV | "RESTORATION COMMAND" | "UNIQUE RESTORATION COMMAND" |
| LOGICAL VOLUME MANAGER | LVM LV | "INFORMATION ACQUISITION COMMAND" | "UNIQUE INFORMATION ACQUISITION COMMAND" |
| LOGICAL VOLUME MANAGER | LVM LV | "OUTSIDE-VOLUME CONFIGURATION INFORMATION ACQUISITION COMMAND" | "UNIQUE OUTSIDE-VOLUME CONFIGURATION INFORMATION ACQUISITION COMMAND" |
| FILESYSTEM | ext2 | "CREATION COMMAND" | "UNIQUE CREATION COMMAND" |
| FILESYSTEM | ext2 | "RESTORATION COMMAND" | "UNIQUE RESTORATION COMMAND" |
| FILESYSTEM | ext2 | "INFORMATION ACQUISITION COMMAND" | "UNIQUE INFORMATION ACQUISITION COMMAND" |
| FILESYSTEM | ext2 | "OUTSIDE-VOLUME CONFIGURATION INFORMATION ACQUISITION COMMAND" | "UNIQUE OUTSIDE-VOLUME CONFIGURATION INFORMATION ACQUISITION COMMAND" |
| FILESYSTEM MOUNT POINT | ext2 | "CREATION COMMAND" | "UNIQUE CREATION COMMAND" |
| FILESYSTEM MOUNT POINT | ext2 | "RESTORATION COMMAND" | "UNIQUE RESTORATION COMMAND" |
| FILESYSTEM MOUNT POINT | ext2 | "INFORMATION ACQUISITION COMMAND" | "UNIQUE INFORMATION ACQUISITION COMMAND" |
| FILESYSTEM MOUNT POINT | ext2 | "OUTSIDE-VOLUME CONFIGURATION INFORMATION ACQUISITION COMMAND" | "UNIQUE OUTSIDE-VOLUME CONFIGURATION INFORMATION ACQUISITION COMMAND" |

35A

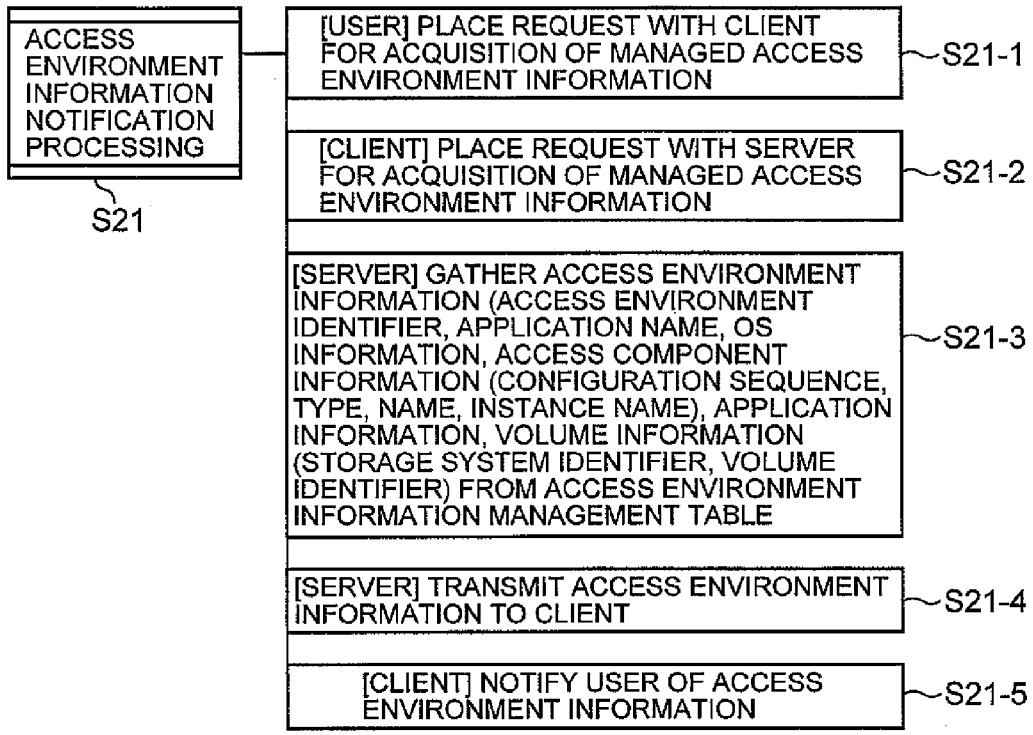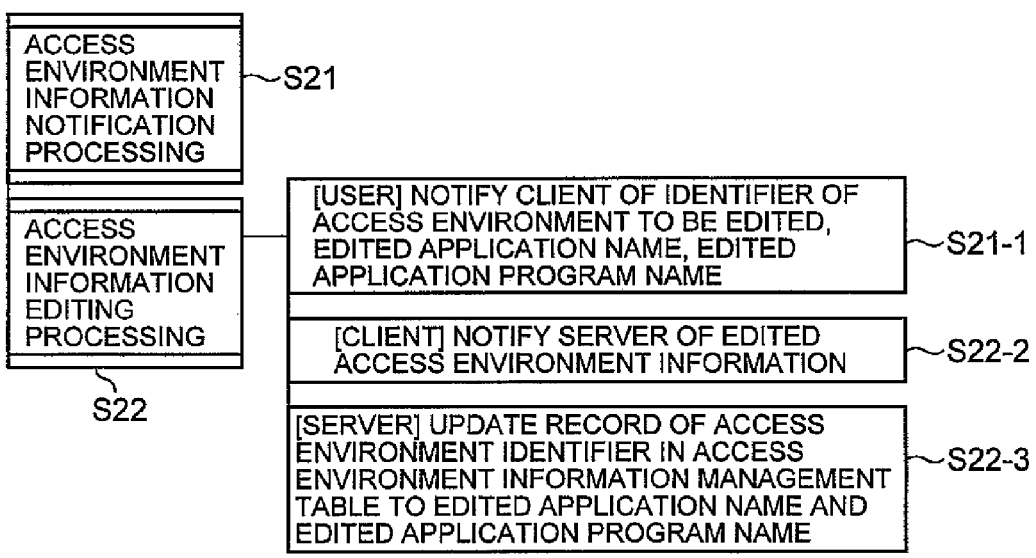

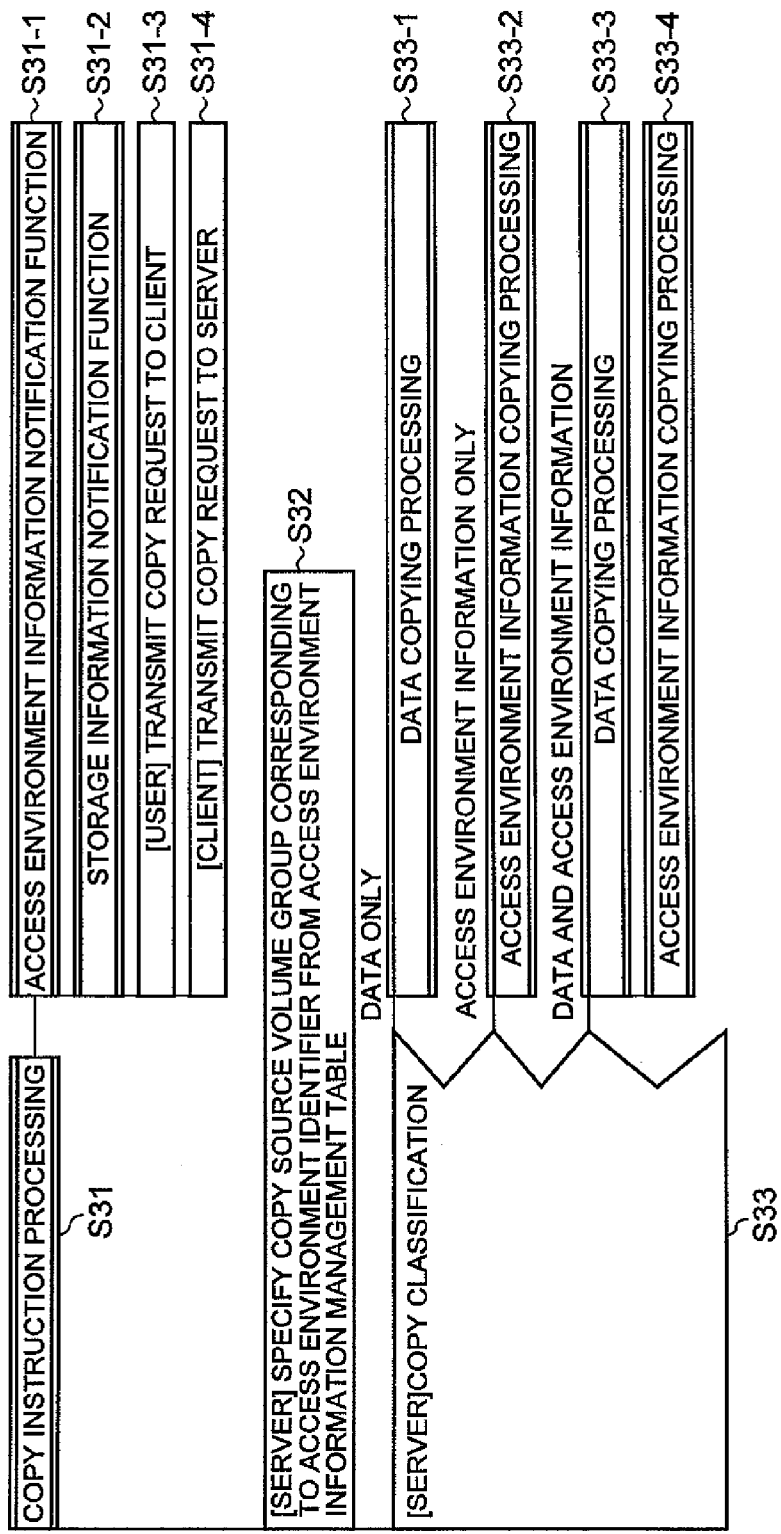
FIG. 10A
FIG. 10B

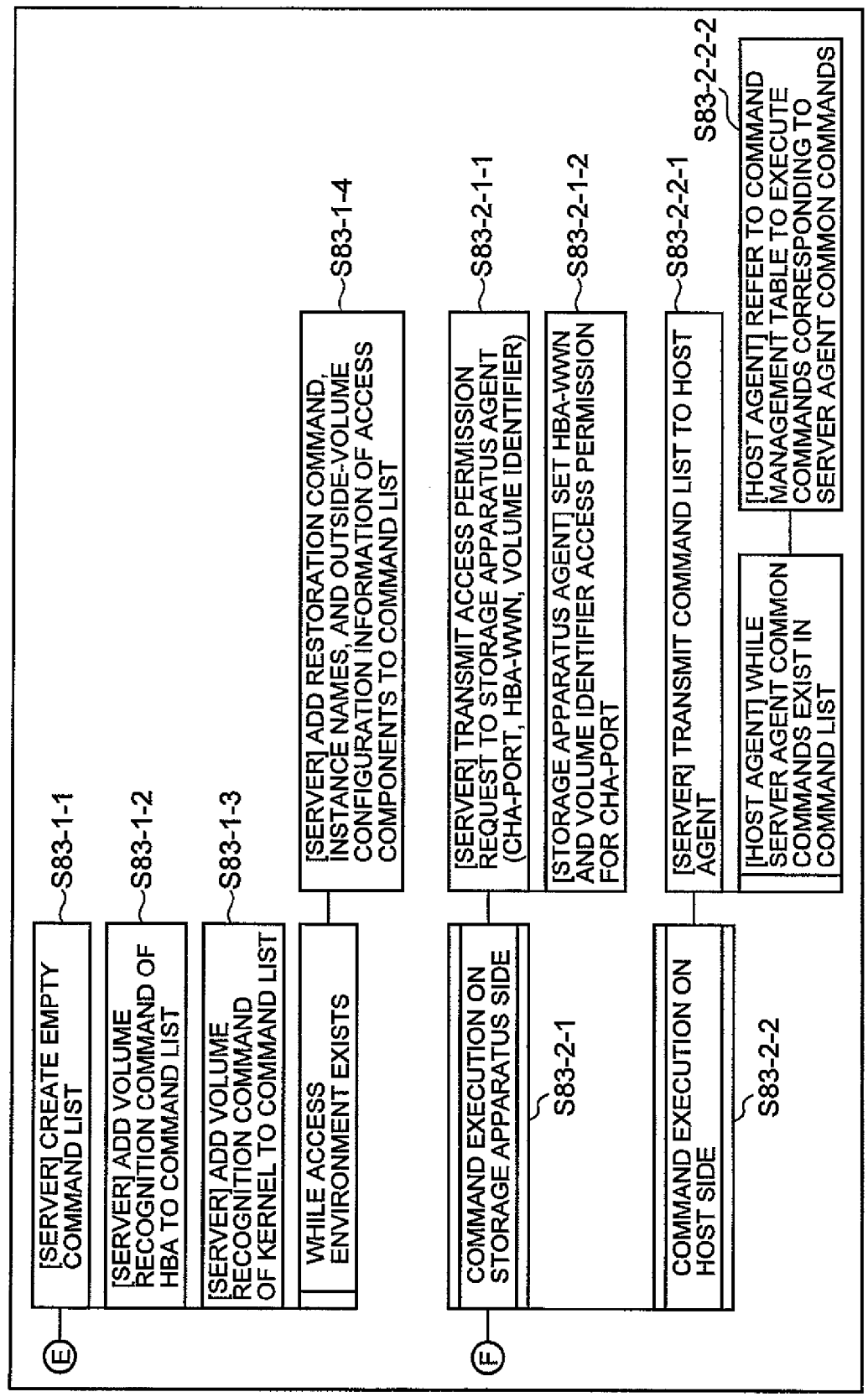

STORAGE CONTROL METHOD FOR MANAGING ACCESS ENVIRONMENT ENABLING HOST TO ACCESS DATA

CROSS-REFERENCE TO PRIOR APPLICATION

This is a continuation of U.S. application Ser. No. 11/333,303, filed Jan. 18, 2006 now abandoned. This application relates to and claims priority from Japanese Patent Application No. 2005-321346, filed on Nov. 4, 2005. The entirety of the contents and subject matter of all of the above is incorporated herein by reference.

FIELD OF THE INVENTION

The present invention relates to data storage technology.

BACKGROUND OF THE INVENTION

The following is disclosed in Japanese Unexamined Patent Application 2005-115438, for example.

A load monitoring unit 21 of a distributed filesystem management server 2 monitors the load status of respective disks 4a to 4m. When the load on a specific disk exceeds a predetermined level, a data control unit 23 moves data stored in the disk to another disk, and updates directory information in a directory information database 221 by reflecting this data migration. When a client makes an inquiry regarding the directory information, a directory notification unit 22 transmits the updated directory information to the client, whereby a cache 321 of a client side directory information database is updated.

A case in which data that can be accessed by a certain application program are copied from a certain logical volume to another logical volume, and a request is placed for access to the data copied into the other logical volume by another application program, for example, is conceivable. For the application program to access the data, an environment for accessing the data is required. When no access environment exists, the access environment must be set.

SUMMARY OF THE INVENTION

An object of the present invention is to enable fast access to data even when an environment for accessing the data does not exist.

Other objects of the present invention will be clarified in the following description.

A storage control method according to the present invention is realized in a system in which an application program in a host accesses data in a certain logical volume from among a plurality of logical volumes provided in one or a plurality of storage systems. In this method, a computer stores volume information, which is information relating to the certain logical volume, in a storage resource. The computer also stores access environment information, which indicates an access environment enabling the application program to access the data using a path between the host and the storage system comprising the certain logical volume, in the storage resource in association with the volume information. The "computer" may be one computer machine or a plurality of computer machines. The "storage resource" may be a resource other than a logical volume.

In a first aspect of the present invention, the access environment information may include access component information relating to a plurality of access components included in the access environment. The access component information may comprise information relating to a configuration sequence of the plurality of access components from the application program side to the data side, and information denoting relationships between each access component and the other access components.

In a second aspect of the present invention, the computer is capable of copying or moving the data from the certain logical volume to another logical volume from among the plurality of logical volumes, and at the same time relating the access environment information associated with the data to the data at a copy destination or movement destination.

In a third aspect of the present invention, according to the second aspect described above, the computer is capable of constructing an access environment enabling another application program in the host or another host to access the data at the copy destination or movement destination, on the basis of the access environment information related to the data at the copy destination or movement destination.

In a fourth aspect of the present invention, according to the third aspect described above, the computer is capable of storing in the storage resource host environment information indicating an access environment that can be constructed in the host or the other host. The host environment information may comprise information relating to the access components that exist in the host or the other host. The computer is capable of determining whether or not an access environment for accessing the data at the copy destination or movement destination can be constructed in the host or the other host on the basis of the host environment information and access environment information, and having obtained an affirmative determination result, the computer is capable of constructing the access environment on the basis of the access environment information related to the data at the copy destination or movement destination.

In a fifth aspect of the present invention, according to the fourth aspect described above, when the computer determines, from the above determination, a lack of access components for constructing the access environment in the host or the other host, the computer is capable of downloading the lacking access component to the host or the other host.

In a sixth aspect of the present invention, according to the third aspect described above, a server is provided in the system. The host or the other host may comprise a host agent program which serves as an agent between the server and the plurality of access components provided in the host or the other host, and command management information indicating procedures to be executed upon reception of various commands. The server is capable of transmitting to the host agent program a command group indicating a sequence in which a plurality of commands are to be executed in order to construct the access environment in accordance with the access environment information. The host agent program is capable of receiving the command group from the server, and in accordance with the execution sequence of the plurality of commands, specified in the command group, causing each command of the command group to be executed by an access component for executing processing corresponding to the command, on the basis of the command management information.

In a seventh aspect of the present invention, the computer is capable of storing the access environment information in the storage resource in association with information relating to the application program.

In an eighth aspect of the present invention, according to the seventh aspect described above, the computer is capable of copying or moving the data from the certain logical volume to another logical volume from among the plurality of logical volumes, and at the same time relating the access environment information associated with the data to the data at the copy destination or movement destination. On the basis of the access environment information related to the data at the copy destination or movement destination, the computer is capable of constructing an access environment for accessing the data at the copy destination or movement destination, in relation to an application program indicated by the application information that is associated with the access environment information related to the data at the copy destination or movement destination, from among a plurality of application programs in the host or another host.

The method described above may be realized using hardware, a computer program, or a combination thereof. The computer program is read and executed by a predetermined processor. During information processing performed by having the processor read the computer program, a physical storage region existing on a hardware resource such as memory may be used appropriately. Further, the computer program may be installed in a computer from a recording medium such as a CD-ROM, or downloaded onto the computer via a communication network.

BRIEF DESCRIPTION OF THE DRAWINGS

FIG. 3 shows a constitutional example of a host information management table 57;

FIG. 4 shows a constitutional example of an access environment information management table 61;

FIG. 5 shows a constitutional example of a storage information management table 63;

FIG. 6 shows a constitutional example of a command management table 35A;

FIG. 9A shows an example of the flow of access environment information notification processing;

FIG. 9B shows an example of the flow of access environment information editing processing;

FIG. 10A shows an example of the flow of copying processing;

FIG. 10B shows an example of the flow of data copying processing in a step S33-3 (and a step S33-1);

FIG. 19 shows the remainder of the example of the flow of the access environment restoration command creation processing;

DETAILED DESCRIPTION OF THE PREFERRED EMBODIMENT

Figure 1:
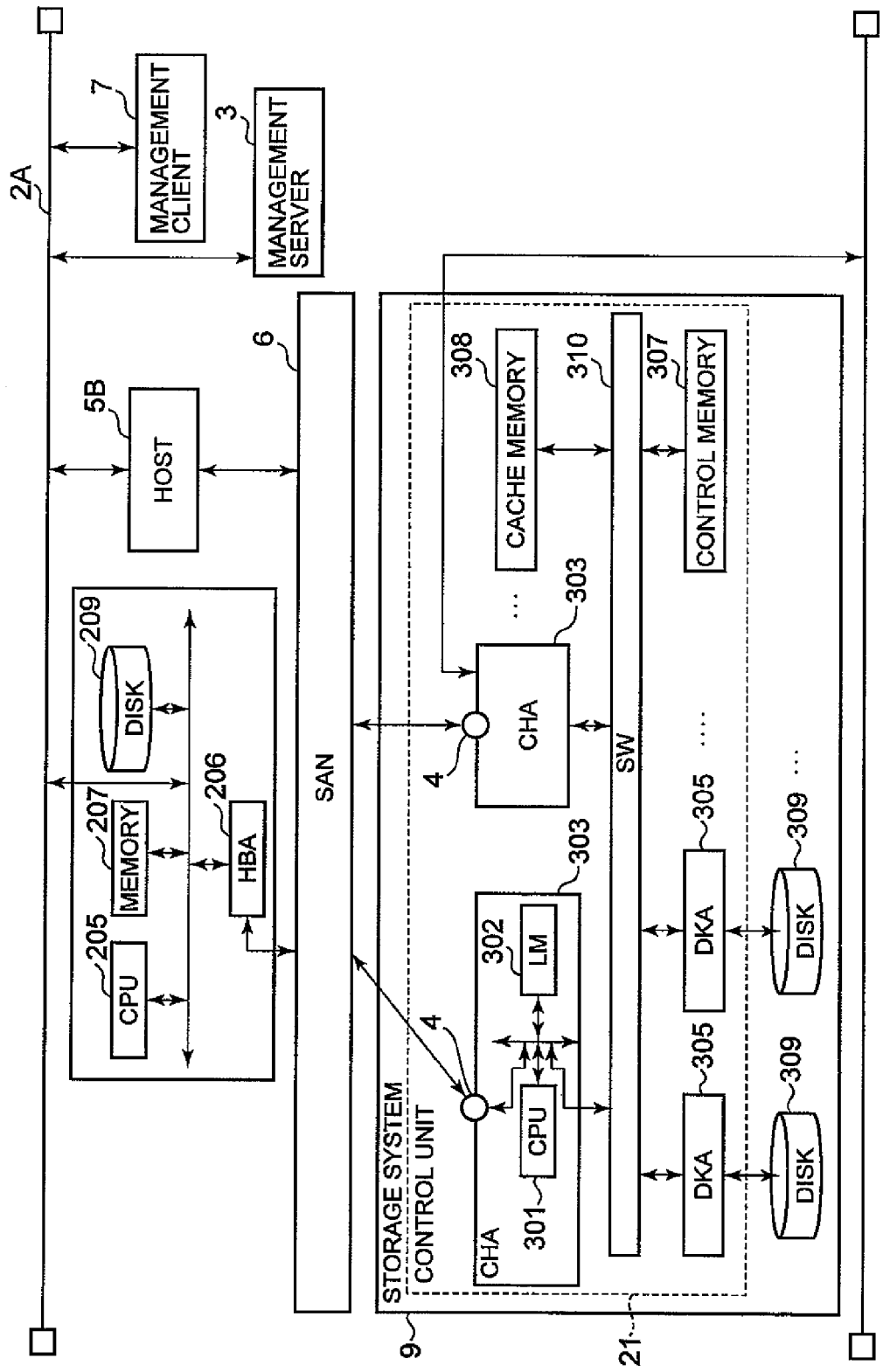
FIG. 1 shows an outline of an example of the physical configuration of a system according to an embodiment of the present invention.

FIG. 1 shows an outline of an example of the physical configuration of a system according to an embodiment of the present invention.

A plurality of hosts 5A, 5B, . . . , a management client 7, and a management server 3 are connected to a communication network 2A such as a LAN (Local Area Network). Further, one or a plurality of storage systems 9 (for ease of explanation, one storage system 9 is provided here) is connected to another (or the same) communication network 2B. The plurality of hosts 5A, 5B, . . . and the storage system 9 are also connected to a SAN (Storage Area Network) 6 (another communication network may be provided in place of the SAN 6).

The hosts 5A, 5B, . . . are computers capable of reading and writing data from and to a logical volume, to be described below, of the storage system 9. The management client 7 is a computer which serves as a client of the management server 3 (occasionally abbreviated to "server 3" hereafter). The management server 3 is a computer for managing the hosts 5A, 5B, . . . and storage system 9. A substantially identical hardware configuration may be employed for all of the hosts 5A, 5B, . . . , management client 7, and management server 3, and therefore the host 5A will be described as a representative example. The host 5A is a computer system comprising hardware resources such as a CPU (Central Processing Unit) 205, memory 207, a disk-form storage apparatus (for example, a hard disk drive) 209, and a host bus adapter (HBA hereafter) 206, for example. The host 5A may be constituted by a personal computer, a workstation, a server machine, a mainframe, or similar, for example. The host 5A may further comprise an information input apparatus (not shown) such as a keyboard switch or pointing device, and an information output apparatus (not shown) such as a monitor display or speakers, for example.

The storage system 9 comprises a control unit 21 and a plurality of disk-form storage apparatuses (HDDs, for example) 309. The control unit 21 controls operations of the storage system 9. The control unit 21 receives a write command from the host 5A, 5B, . . . and writes data to the disk-form storage apparatuses 309 in accordance with the write command, or receives a read command from the host 5A, 5B, . . . , reads data from the disk-form storage apparatuses 309 in accordance with the read command, and transmits the read data to the host 5A, 5B, . . . . The control unit 21 comprises a plurality of channel adapters (CHA hereafter) 303, a plurality of disk adapters (DKA hereafter) 305, cache memory 308, control memory 307, and a switch (SW hereafter) 310, for example.

The CHA 303 controls communication with the host 5A, 5B, . . . . The CHA 303 is capable of writing data from the host 5A, 5B, . . . into the cache memory 308, reading data written by the DKA 305 from the cache memory 308, and transmitting the read data to the host 5A, 5B, . . . . The CHA 303 comprises one or a plurality of communication ports 4 (for ease of explanation, one communication port 4 is provided here), a CPU 301, and memory (referred to as local memory (LM) hereafter) 302. The communication port provided in the CHA 303 will be referred to as a "CHA-Port" hereafter.

The DKA 305 controls communication with the disk-form storage apparatus 309. The DKA 305 is capable of writing data from the disk-form storage apparatus 309 into the cache memory 308, reading data written by the CHA 303 from the cache memory 308, and writing the read data into the disk-form storage apparatus 309. A substantially identical hardware configuration to that of the CHA 303 may be employed for the DKA 305.

The cache memory 308 is capable of storing data exchanged between the host 5A, 5B, . . . and disk-form storage apparatus 309. The control memory 307 is capable of storing information (for example, volume management information indicating the logical volume (not shown) that is provided by each disk-form storage apparatus 309) required to control the storage system 9.

The SW 310 is capable of switching the connections between the CHA 303, cache memory 308, control memory 307, and DKA 305.

An outline of an example of the physical configuration (hardware configuration) of the system according to this embodiment was described above. Note that the configuration of the storage system 9, for example, is not limited to the configuration described above, and for example, the control unit 21 may be a circuit board comprising one or a plurality of CPUs and one or a plurality of memories having a region serving as the cache memory 308 and/or a region serving as the control memory 307.

In this embodiment, an application program of each host 5A, 5B, . . . is capable of accessing a logical volume in accordance with an access environment constituted by a plurality of elements. Examples of the elements (access components hereafter) that may constitute the access environment include a path management software manager, a software RAID (Redundant Array of Independent Inexpensive Disks) manager, a logical volume manager, a filesystem, and so on.

To recover backed-up data, the access environment at the time of data access must be maintained until the data are recovered.

However, it is considered difficult to maintain the access environment of the host 5A, 5B, . . . for a long time. When recovering data that were backed up several years ago, for example, the access environment of that time is rarely maintained.

It is also believed that data access is heavily dependent on the environment of the host 5A, 5B, . . . . For example, with RAID technology, data availability is improved, but the access environment of the data is not made redundant. Hence, when the access environment of the data is broken, the data can no longer be accessed.

Moreover, situations in which data recovery becomes difficult may also arise. Specifically, when offline (a situation in which the environment at the time of data access is not established, and therefore the application program cannot access the data) data are to be switched to online (a situation in which the environment at the time of data access is established, and therefore the application program can access the data) data, for example, the following problems may occur. For example, it may be impossible to know the type of data stored in the storage system 9 under the management of the management server 3. It may also be impossible to know the logical volume in which the data are stored. It may also be impossible to know the application program required to access the data, and it may also be impossible to know the access environment required to access the data. Moreover, to switch offline data to online data, a manager must manipulate the access components, but the manipulation method varies depending on the access component, which may place a load on the manager. For these reasons, it may be difficult to restore data even when the data are backed up on a logical volume.

If the logical volume in which the data are stored is not known, it may also be difficult to retrieve a logical volume in which no data are stored. Hence, the logical volume storing the data may be mistakenly allotted as a new logical volume, for example, with the result that the stored data are deleted.

In this embodiment, a logical configuration devised to solve the problems envisaged above is constructed over the physical configuration described above. This logical configuration will now be described.

Figure 2:
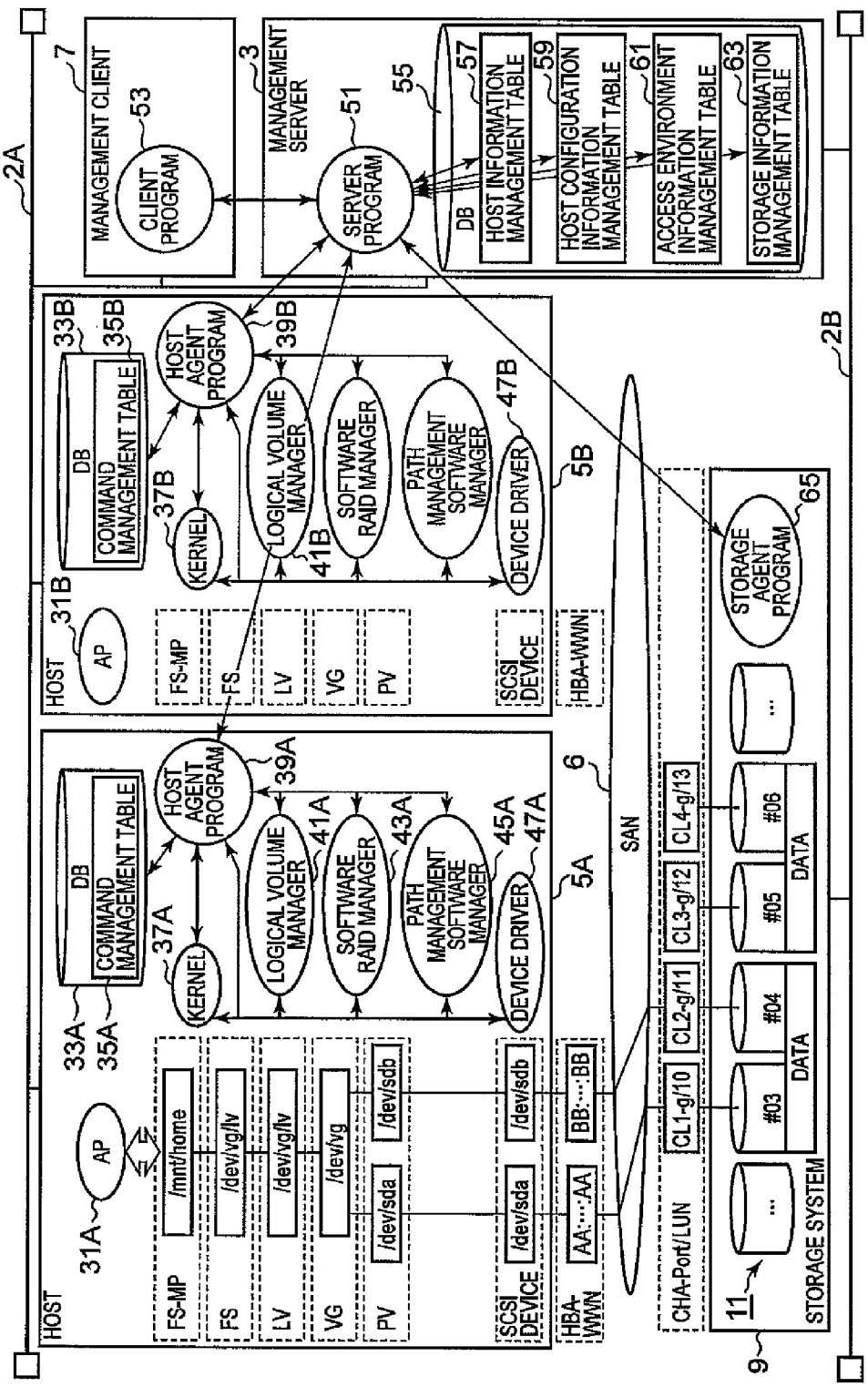
FIG. 2 shows an outline of an example of the logical configuration of the system according to an embodiment of the present invention.

FIG. 2 shows an outline of an example of the logical configuration of the system according to this embodiment.

A computer program is stored in a storage resource (for example, a disk-form storage apparatus or memory) of the hosts 5A, 5B, . . . , management client 7, management server 3, and storage system 9, and the CPU is capable of performing predetermined processing by reading and executing these computer programs. Hereafter, to reduce the length of this type of description, simple expressions such as "a computer program performs processing" will be used.

The management client 7 comprises a client program 53. The client program 53 is resident in the management client 7. The client program 53 is capable of transmitting an instruction to a server program 51 and displaying the result thereof on a display apparatus of the management client 7.

The management server 3 comprises the server program 51 and a database (DB hereafter) 55. The DB 55 is constructed using a disk-form storage apparatus, for example. The DB 55 is capable of storing a host information management table 57, a host configuration information management table 59, an access environment information management table 61, and a storage information management table 63, for example.

The server program 51 is resident in the management server 3. The server program 51 is capable of interpreting the instruction from the client program 53, and transmitting the instruction to respective agent programs 39A, 39B, . . . , 65 provided in the hosts 5A, 5B, . . . and storage system 9.

Information relating to the environments of the hosts 5A, 5B, . . . is recorded in the host information management table 57. Information relating to the configuration of the hosts 5A, 5B, . . . is recorded in the host configuration information management table 59. Information relating to the configuration of the environment required for accessing data is recorded in the access environment information management table 61. Information relating to the storage system 9 is recorded in the storage information management table 63.

The host 5A comprises an application program (AP hereafter) 31A, a kernel 37A, a logical volume manager 41A, a software RAID manager 43A, a path management software manager 45A, a device driver 47A, the host agent program 39A, and a DB 33A.

The AP 31A operates on an operating system (OS hereafter), not shown in the drawing, of the host 5A, and is capable of obtaining data read from a logical volume 11 and transmitting data stored in the logical volume 11.

The kernel 37A is software packaging the basic functions of the OS. The kernel 37A serves as a nucleus part of the OS, and is capable of providing basic OS functions such as monitoring the various computer programs (for example, 31A, 41A, 43A, 45A, 39A), managing resources such as disks and memory, and performing allocation processing.

The logical volume manager 41A is a computer program capable of managing the plurality of logical volumes 11 in the storage system 9 collectively and providing a computer program on a higher level than the logical volume manager 41A with a volume having an arbitrary capacity.

The software RAID manager 43A is a computer program capable of managing the plurality of logical volumes 11 in the storage system 9 collectively, and providing a computer program on a higher level than the software RAID manager 43A with a RAIDed volume.

The path management software manager 45A is a computer program capable of managing a plurality of paths of the logical volumes 11 in the storage system 9 collectively, and providing a computer program on a higher level than the path management software manager 45A with redundant access means to the logical volumes 11.

The device driver 47A is a computer program capable of controlling communication between the host 5A and the logical volumes in the storage system 9.

The host agent program 39A is capable of receiving a command list from the server program 51, and issuing a command to a computer program such as the OS or logical volume manager 41.

The DB 33A is capable of storing a command management table 35A, for example. The command management table 35A expresses correspondence between instructions and commands from the server program 51 and command procedures issued to a computer program in the host 5A.

The storage system 9 comprises the plurality of logical volumes 11 and a storage agent program 65.

Each logical volume 11 is set on the plurality of disk-form storage apparatuses 309. More specifically, for example, a physical volume (PV) is provided by the physical storage region of each disk-form storage apparatus 309, a single volume group (VG) is constituted by the plurality of physical volumes, and a single storage region partitioned from the VG is a logical volume (LV).

The storage agent program 65 is capable of receiving, interpreting, and executing an instruction from the server program 51.

More specifically, for example, the storage agent program 65 is capable of setting logical volume access rights (for example, permitting both writing and reading, prohibiting writing but permitting reading, and so on) in accordance with an instruction from the server program 51.

The storage agent program 65 is also capable of receiving an HBA-WWN (the worldwide name of the host bus adapter), a volume identifier, and a CHA-Port identifier from the server program 51. Further, in accordance with an instruction from the server program 51, the storage agent program 65 is capable of setting an HBA-WWN and logical volume access rights in relation to a specified CHA-Port (for example, the HBA-WWN of the host and the identifier of the logical volume with which the specified CHA-Port can communicate).

The storage agent program 65 is also capable of copying data in a copy source volume group (one or a plurality of logical volumes) specified by the server program 51 into a copy destination volume group.

The storage agent program 65 is also capable of moving data in a migration source volume group (one or a plurality of logical volumes) specified by the server program 51 into a migration destination volume group.

The storage agent program 65 is also capable of notifying the server program 51 of a volume identifier and access rights set in the CHA-Port 4 (for example, the HBA-WWN of the host and the identifier of the logical volume which are capable of connecting to the CHA-Port 4).

In the storage system 9, data switch from online to offline appropriately. For example, data stored in a logical volume having a certain priority level or less may be switched to an offline state. Further, for example, when data in a first logical volume used by the host 5A are to be moved to a second logical volume used by the host 5B, the first logical volume may be switched offline while the second logical volume is switched online. Further, for example, when data are copied from a copy source volume group to a copy destination volume group, the copy destination volume group may be switched offline. Further, for example, when data are moved from a movement source volume group to a movement destination volume group, the movement destination volume group may be switched offline.

An outline of the logical configuration of the system according to this embodiment was described above.

In FIG. 2, "FS-MP" in the dotted line box denotes a mount point of a filesystem. The solid line box within the dotted line box indicates the instance of the mount point, and "/mnt/home" denotes the instance name thereof.

"FS" in the dotted line box denotes the filesystem. The solid line box within the dotted line box indicates the instance of the filesystem, and "/dev/vg/lv" denotes the instance name thereof.

"LV" in the dotted line box denotes a module (LV management module hereafter) for managing the logical volumes in the logical volume manager 41A. The solid line box within the dotted line box indicates the instance of the module, and "/dev/vg/lv" denotes the instance name thereof.

"VG" in the dotted line box denotes a module (VG management module hereafter) for managing the volume groups in the logical volume manager 41A. The solid line box within the dotted line box indicates the instance of the module, and "/dev/vg" denotes the instance name thereof.

"PV" in the dotted line box denotes a module (PV management module hereafter) for managing the physical volumes in the logical volume manager 41A. The solid line boxes within the dotted line box indicate the instances of the module, and "/dev/sda" and "/dev/sdb" denote the respective instance names thereof.

"SCSI device" in the dotted line box denotes a module (SCSI device module hereafter) in the device driver 47A for controlling communication in accordance with the SCSI protocol. The solid line boxes within the dotted line box indicate the instances of the module, and "/dev/sda" and "/dev/sdb" denote the respective instance names thereof.

"HBA-WWN" in the dotted line box denotes the WWN of the HBA 206. The alphabetic characters in the solid line boxes within the dotted line box are examples of WWNs.

"CHA-Port/LUN" in the dotted line box denotes the CHA-Port identifier and the logical unit number. More specifically, in "CL 1-g/10" in the solid line box within the dotted line box, "CL 1-g" is the CHA-Port identifier, and "10" is the LUN.

The set comprising "#" and a number in each logical volume 11 denotes the logical volume identifier. Hereafter, "LV-#03" will be used to specify the logical volume 11 having the identifier #03.

The solid line linking the instance of the FS-MP to LV-#03 and LV-#04 denotes a path taken by the AP 31A to access the data in LV-#03 and LV-#04. Of this path, the section linking the instance of the FS-MP to the HBA-WWN denotes the environment (access environment) for accessing the data in LV-#03 and LV-#04.

In other words, the so-called access environment of this embodiment may be constructed not simply by access components, but according to the sequence in which the plurality of access components execute processing. More specifically, the access environment can be constructed according to associations between information (the instance in this embodiment) managed by one access component and information managed by the other access components.

According to FIG. 2, the access components of the environment enabling the AP 31A to access the data in LV-#03 and LV-#04 are, in order from the lowest level closest to the data, the SCSI device module in the device driver 47A, the PV management module, VG management module, and LV management module in the logical volume manager 41A, the FS, and the FS-MP. The access environment is constructed by associating the respective instances of the plurality of access components arranged in this order as shown in the drawing. In this access environment, two logical volumes are recognized up to the PV management module, but by means of the upper level management of the VG management module and above, the two volumes can be recognized as a single volume by the AP 31A. Thus, in accordance with an instruction from the AP 31A, a determination is made by the processing of the VG management module and PV management module as to whether to access one or both of LV-#03 and LV-#04, and hence the AP 31A is able to access the data existing in one or both of LV-#03 and LV-#04.

Further, as can be understood from the above description, the so-called access environment of this embodiment differs from a logical path (for example, a combination of the HBA-WWN, CHA-Port identifier, and logical unit number) that is laid out for the host 5A, 5B, . . . to access the logical volume 11. The logical path extends from the host 5A, 5B, . . . to the logical volume 11, whereas the access environment is located within the host 5A, 5B, . . . .

In this embodiment, information indicating this access environment (access environment information hereafter) is managed in association with the volume (volume identifier, for example) in which the access destination data are stored, and the AP (AP identifier, for example) accessing the data. When an access environment required for another AP to access the data does not exist, the access environment is restored automatically for the other AP on the basis of the managed access environment information, enabling the other AP to access the data under the restored access environment.

Constitutional examples of the various tables mentioned above and the processing that is performed in this embodiment will be described in detail below. Note that in the following description, as shown in FIG. 2, substantially identical access components to those existing in the host 5A, i.e. the SCSI device module in the device driver 47B, the PV management module, VG management module, and LV management module in the logical volume manager 41B, the FS, and the FS-MP, are assumed to exist in the host 5B. However, the sequence of the access components and the instances managed by each access component are not associated with each other, and therefore an access environment enabling the AP 31B to access the data in LV-#03 and LV-#04 does not exist in the host 5B.

FIG. 3 shows a constitutional example of the host information management table 57.

The host information management table 57 is used during "access environment restoration", to be described below, to determine whether or not the access environment can be restored in a specified host. A prerequisite for restoring an access environment is that the host specified as the restoration destination must be capable of using identical access components to the access components constituting the access environment to be restored (for example, the access components must exist within the host).

For example, the host information management table 57 may comprise, for each host, information for identifying the host (host identification information hereafter), information relating to the operating system (OS hereafter) installed in the host (OS information hereafter), information indicating the components that can be used by the host from among a component group for accessing the data in the logical volumes (usability information hereafter), and the HBA-WWN of the HBA installed in the host. The host identification information may include, for example, a host identifier, a host name, and a network address (an IP address, for example). The OS information may include, for example, the type of OS or the name of the OS. The usability information may include, for example, the types and names of the usable access components.

Note that here, "usable access components" are access components already existing in the host, but may simply be access components that can be installed in the host. More specifically, for example, if it can be determined on the basis of the resource information (storage capacity, CPU capability, and so on, for example) of the host that an access component can be installed in the host when the access component does not exist in the host, then the access component can be downloaded to the host from a predetermined site and added to the host. The access environment can then be restored.

FIG. 4 shows a constitutional example of the access environment information management table 61.

In this embodiment, the access environment information, or in other words information indicating the environment required to access data, can be managed separately to information indicating the current access environment of the host (host environment hereafter). The reason for this is that the access environment of the host and the access destination data have different life spans.

For example, the access environment information management table 61 may include, for each access environment, an access environment identifier, an application name, OS information, access component information, application information, and volume information. The access environment identifier may be constituted by an identifier enabling the access environment to be identified uniquely in the management server 3. The application name is information indicating the application in which the access environment is used, and may be constituted by a name given by a user of the host (host user hereafter). The OS information may include the type or name of the OS using the data. The application information is information indicating the type of application in which the data are used, and may be constituted by a name given by the host user. The volume information is information for identifying the logical volumes of the storage system 9 that are managed by the management server 3, and may include a set comprising a storage system identifier and a volume identifier.

The access component information includes, for example, a configuration sequence, the type, name, and instance name of each access component, and outside-volume configuration information.

The configuration sequence comprises numbers indicating the relationships between the access components. More specifically, for example, the configuration sequence indicates the sequence of the access components from the data side (lower level side) to the AP side (upper level side). During access environment restoration (or creation), restoration (or creation) must be performed from the lower level access component upward.

The configuration information (metadata) of the access components may be described within the logical volume or outside of the logical volume (for example, in a file or DB on the host, or elsewhere). In the latter case, outside-volume configuration information is recorded ("null" indicates that configuration information exists in the volume). Note that the configuration information includes, for example, information such as the block count, the file count, and the begin block number of each datum, information indicating the management manager to which the configuration information is subject, and so on. The configuration information differs according to the type of access component.

The server program 51 is capable of notifying the host agent program 39A, 39B of the type and name of the access component and commands determined by the server program 51 and host agent program 39A, 39B. The host agent program 39A, 39B is capable of specifying the management manager of the access component from the type and name of the access component (for example, if the access component is the PV management module, then the management manager is the logical volume manager), converting a command determined by the server program 51 and host agent program 39A, 39B into a command that is unique to the management manager of the access component, and executing the command.

FIG. 5 shows a constitutional example of the storage information management table 63.

The storage information management table 63 includes, for each storage system 9 under the management of the management server 3, a storage system identifier, the identifier of each volume, the identifier of each CHA-Port, and information indicating the CHA-Port via which each volume is disclosed to the HBA-WWN (disclosure information hereafter) ("null" indicates that a volume is not disclosed). Note that in this embodiment, volume disclosure/non-disclosure differs from whether or not data are online or offline. For example, even if a volume is disclosed to a host, the application program in the host cannot access the data in the volume unless an access environment for accessing the data exists.

FIG. 6 shows a constitutional example of the command management table 35A. Note that a command management table 35B of the host 5B may employ a substantially identical constitution.

The command management table 35A includes information regarding the processing (host agent program-executed procedure) that is to be executed when a certain command (server agent common command) is issued to a certain access component. From the table, the server program 51 is able to issue instructions to the host agent program 39A, 39B without regard for unique platform differences.

Examples of the server agent common commands include the following six types:
(1) volume recognition command;
(2) volume information acquisition command;
(3) new access component creation command;
(4) access component restoration command;
(5) access component information acquisition command;
(6) access component outside-volume configuration information acquisition command.

Under an access component restoration command in particular, the following three procedures may be performed:
(1) rewriting the configuration information of the access component;
(2) generating an instance for the access component;
(3) recording the instance name in the management manager of the access component.

These three procedures may be recorded as the host agent program-executed procedures.

Figure 7:
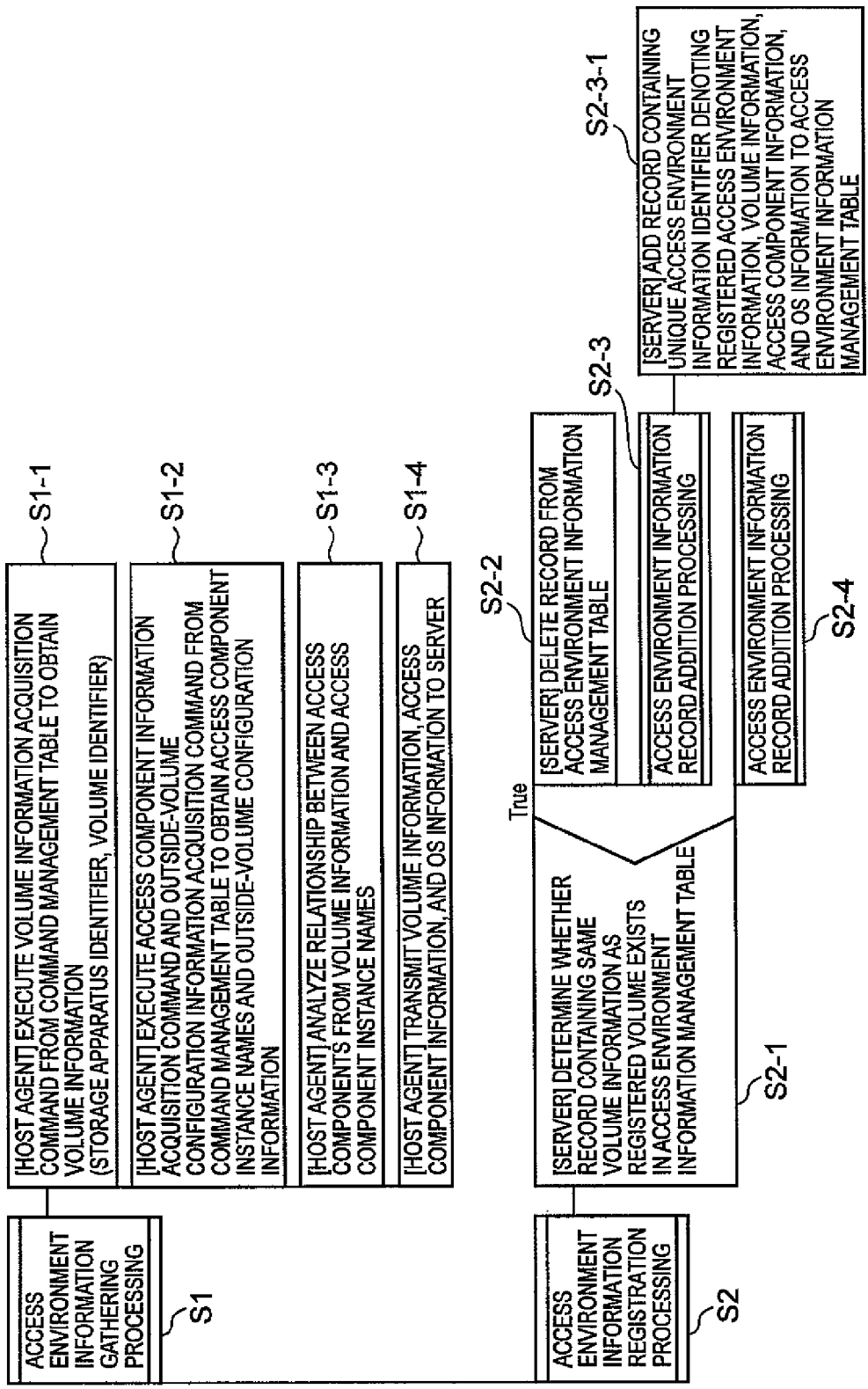
FIG. 7 shows an example of the flow of access environment information gathering processing and access environment registration processing.

FIG. 7 shows an example of the flow of access environment information gathering processing and access environment registration processing. In the following description, the host agent program 39A is used as a representative example of the host agent programs 39A, 39B.

In access environment information gathering processing (step S1), the processing of the following steps S1-1 to S1-4 is performed.

Step S1-1: the host agent program 39A reads a volume information acquisition command from the command management table 35A, converts the command into a command that can be interpreted by the kernel 37A (and/or the HBA), and provides the kernel 37A (and/or the HBA) with the converted command. As a result, processing corresponding to the volume information acquisition command is performed. More specifically, for example, volume information (for example, the storage system identifier and volume identifiers corresponding to each logical volume) is obtained from a volume management table (a table recorded with information relating to each logical volume recognized by the host 5A), which is stored in the storage resources of the host 5A.

Step S1-2: the host agent program 39A reads various acquisition commands from the command management table 35A for obtaining information relating to each access component, converts each acquisition command into a command corresponding to each access component, and provides the respective access components with the converted commands. As a result, processing corresponding to the access component acquisition commands is performed. More specifically, for example, access component information (for example, the instance name and outside-volume configuration information) for each access component is obtained from the storage resources of the host 5A, in which the access component information is stored for each access component.

Step S1-3: the host agent program 39A analyzes the relationship between the access components on the basis of the volume identification information obtained in the step S1-1 and the instance names of the access component information obtained in the step S1-2. More specifically, for example, the host agent program 39A is able to determine the configuration sequence of the access components, to be transmitted in a step S1-4, on the basis of the information gathered in the step S1-2.

Step S1-4: the host agent program 39A transmits the volume identification information (storage system identifier and volume identifiers), access component information (determined configuration sequence, types, names, instance names, and outside-volume configuration information), and the OS information of the OS in the host 5A to the management server 3.

In the access environment information registration processing (step S2), the processing of the following steps S2-1 to S2-4 is performed.

Step S2-1: the server program 51 determines whether or not a record containing the same volume information as the volume information received from the host 5A exists in the access environment information management table 61.

Step S2-2: when an affirmative determination result is obtained in the step S2-1 (true in S2-1), the server program 51 deletes the aforementioned existing record from the access environment information table 61. Access environment information record addition processing (step S2-3) is then performed. Here, the server program 51 adds a record including the volume information, access component information, and OS information received from the host 5A to the access environment information table 61 (step S2-3-1).

Step S2-4: when a negative determination result is obtained in the step S2-1, the server program 51 executes similar access environment information record addition processing to that of the step S2-3.

The access environment information gathering processing (step S1) may also be initiated in accordance with a request from the management client 7.

Figure 8:
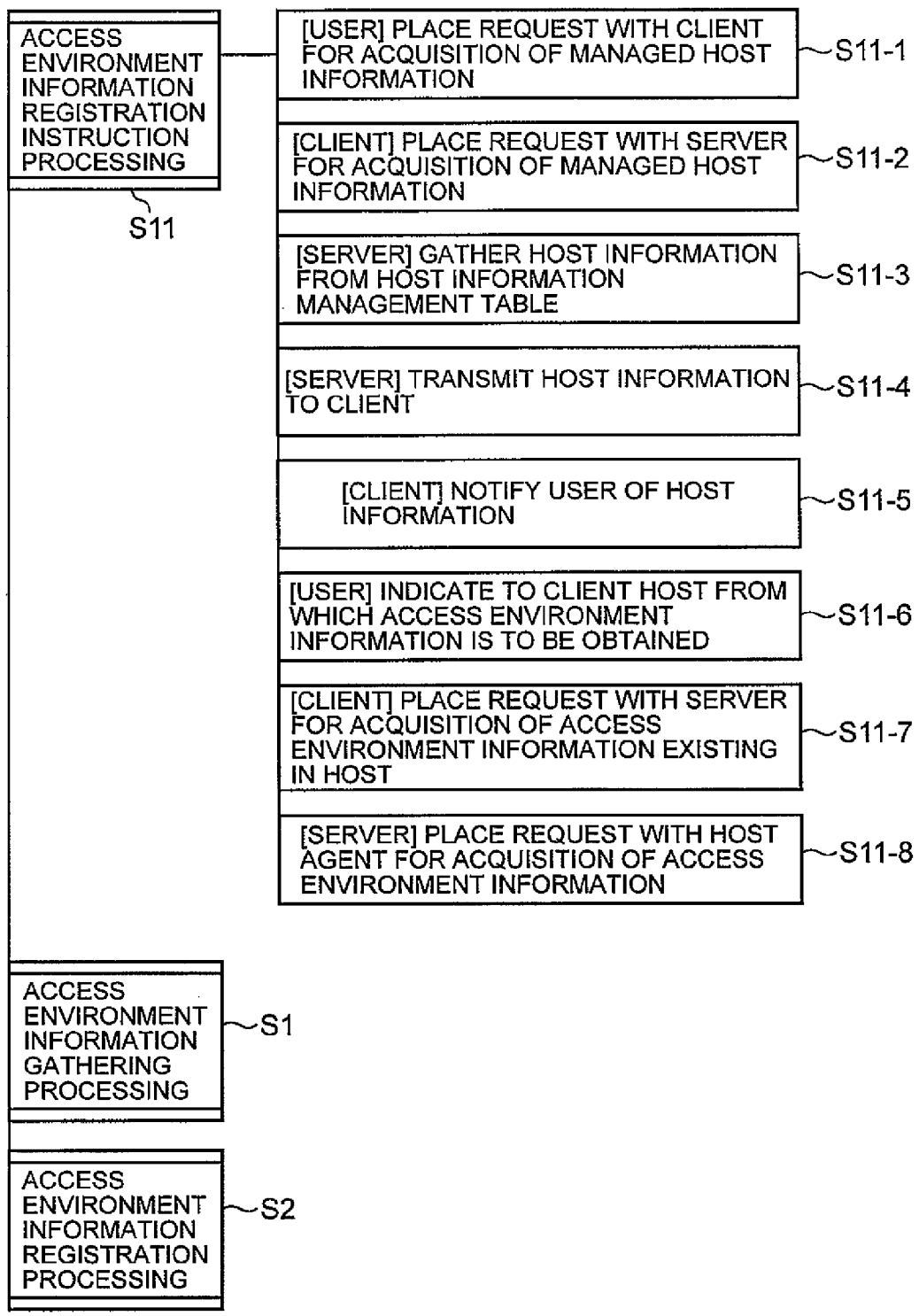
FIG. 8 shows an example of the flow of processing performed when a management client requests an access environment information gathering function of a host.

FIG. 8 shows an example of the flow of processing performed when the management client requests the access environment information gathering function of the host.

In access environment registration instruction processing (step S11), the processing of the following steps S11-1 to S11-8 is performed. This access environment registration instruction processing may serve as a trigger for initiating the access environment information gathering processing (step S1).

Step S11-1: a user of the management client 7 (management user hereafter) places a request with the management client 7 for acquisition of the host information that is under the management of the management server 3.

Step S11-2: the client program 53 places a request with the management server 3 for acquisition of the host information in accordance with the request from the management user.

Step S11-3: the server program 51 obtains the host identification information and OS information of each record in the host information management table 57.

Step S11-4: the server program 51 transmits the obtained host identification information and OS information to the management client 7.

Step S11-5: the client program 53 displays at least the host identification information, from the host identification information and OS information received from the management server 3, on a display screen of the management client 7.

Step S11-6: the management user specifies the host from which the access environment information is to be obtained from the displayed list of host identification information.

Step S11-7: the client program 53 places a request with the management server 3 for acquisition of the access environment information in the host specified by the management user.

Step S11-8: the server program 51 issues an access environment information acquisition request to the host agent program 39A of the host specified by the management client 7 in accordance with the request from the management client 7.

FIG. 9A shows an example of the flow of access environment information notification processing.

In the access environment information notification processing (step S21), the processing of the following steps S21-1 to S21-5 is performed.

Step S21-1: the management user places a request with the management client 7 for acquisition of the access environment information that is under the management of the management server 3.

Step S21-2: the client program 53 places a request with the management server 3 for acquisition of the access environment information in accordance with the request from the management user.

Step S21-3: the server program 51 obtains the access environment information (for example, the access environment identifier, application name, OS information, access component information, application information, and volume information) of each record in the access environment information management table 61.

Step S21-4: the server program 51 transmits the obtained access environment information to the management client 7.

Step S21-5: the client program 53 displays the access environment information received from the management server 3 on the display screen of the management client 7.

FIG. 9B shows an example of the flow of access environment information editing processing.

The access environment information editing processing (S22) may be performed after the access environment information notification processing (step S21), for example. In the access environment information editing processing, the processing of the following steps S22-1 to S22-3 is performed.

Step S22-1: the management user edits a desired element of the access environment information selected from the displayed list of the access environment information (note, however, that control may be performed to ensure that the access environment identifier is not edited).

Step S22-2: the client program 53 notifies the management server 3 of the edited access environment information.

Step S22-3: the server program 51 extracts from the access environment information management table 61a record containing the access environment identifier of the edited access environment information received from the management client 7, and updates the information in the extracted record to the edited access environment information.

FIG. 10A shows an example of the flow of copying processing.

The copying processing may be performed after the access environment information notification processing, for example. In the copying processing, the processing of the following steps S31 to S33 is performed.

Step S31: copy instruction processing is performed. More specifically, for example, access environment information notification processing such as that of the step S21 is performed (step S31-1), whereupon storage information notification processing (step S31-2) is performed. The management user is then able to issue a copy request (for example, a request including the copy classification, access environment identifier, and the identifier of each volume constituting the copy destination volume group) to the management client 7 (step S31-3). The client program 53 is able to transmit this request to the management server 3 (step S31-4).

Step S32: the server program 51 specifies a record containing the copy destination volume group included in the copy request from the management server 7 from the access environment information management table 61.

Step S33: the server program 51 identifies the copy classification included in the copy request. If the identified copy classification is "data only", data copying processing (step S33-1) is performed. If the identified copy classification is "access environment information only", access environment information copying processing (step S33-2) is performed. If the identified copy classification is "data and access environment information", both data copying processing (step S33-3) and access environment information copying processing (step S33-4) are performed. As a result, the access environment for accessing the data is associated with the copy destination volume group, and therefore, in subsequent access environment restoration processing, the application program of the host can be restored to a state in which it is able to access data.

FIG. 10B shows an example of the flow of the data copying processing of the step S33-3 (and the step S33-1).

Step S33-3-1: the server program 51 issues a data copying request (for example, the identifier of each copy source volume and the identifier of each copy destination volume) to the storage agent program 65. The copy source volume identifiers may be volume identifiers corresponding to the access environment identifier included in the aforementioned copy request.

Step S33-3-2: the storage agent program 65 identifies the copy source volumes and copy destination volumes from the data copying request received from the server program 51, and copies the data in the copy source volumes into the copy destination volumes.

Figure 11:
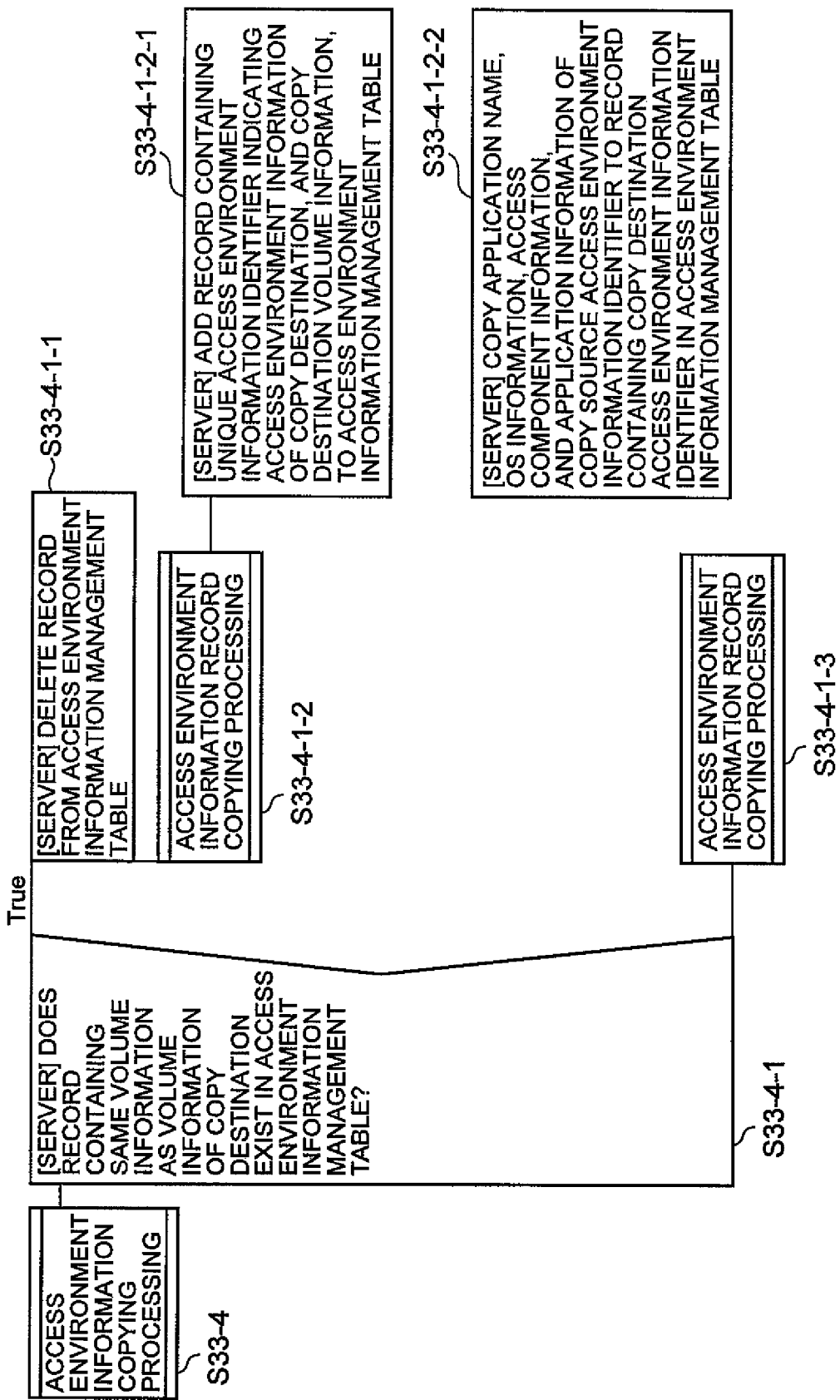
FIG. 11 shows an example of the flow of data copying processing in a step S33-4 (and a step S33-2)

FIG. 11 shows an example of the flow of the access environment information copying processing of the step S33-4 (and the step S33-2).

Step S33-4-1: the server program 51 determines whether or not a record containing the same volume information as the volume information included in the copy destination volume identifiers of the aforementioned copy request exists in the access environment information management table 61.

Step S33-4-1-1: when an affirmative determination result is obtained in the step S33-4-1 (true in the step S33-4-1), the server program 51 deletes the aforementioned existing record from the access environment information table 61. Access environment information record copying processing (step S33-4-1-2) is then performed.

Here, the server program 51 adds to the access environment information table 61 a record containing a unique access environment identifier denoting the copy destination access environment information, and the copy destination volume information (for example, identifiers of the copy destination storage system and copy destination volumes) (step S33-4-1-2-1). The server program 51 then copies the access environment information of the copy source other than the access environment identifier to the added record (step S33-4-1-2-2). Note that the copy source access environment information may include, for example, the access environment identifier included in the copy request from the management client 7.

Step S33-4-1-1: when a negative determination result is obtained in the step S33-4-1, similar access environment information record copying processing to that of the step S33-4-1-2 is performed (step S33-4-1-3).

Figure 12A:
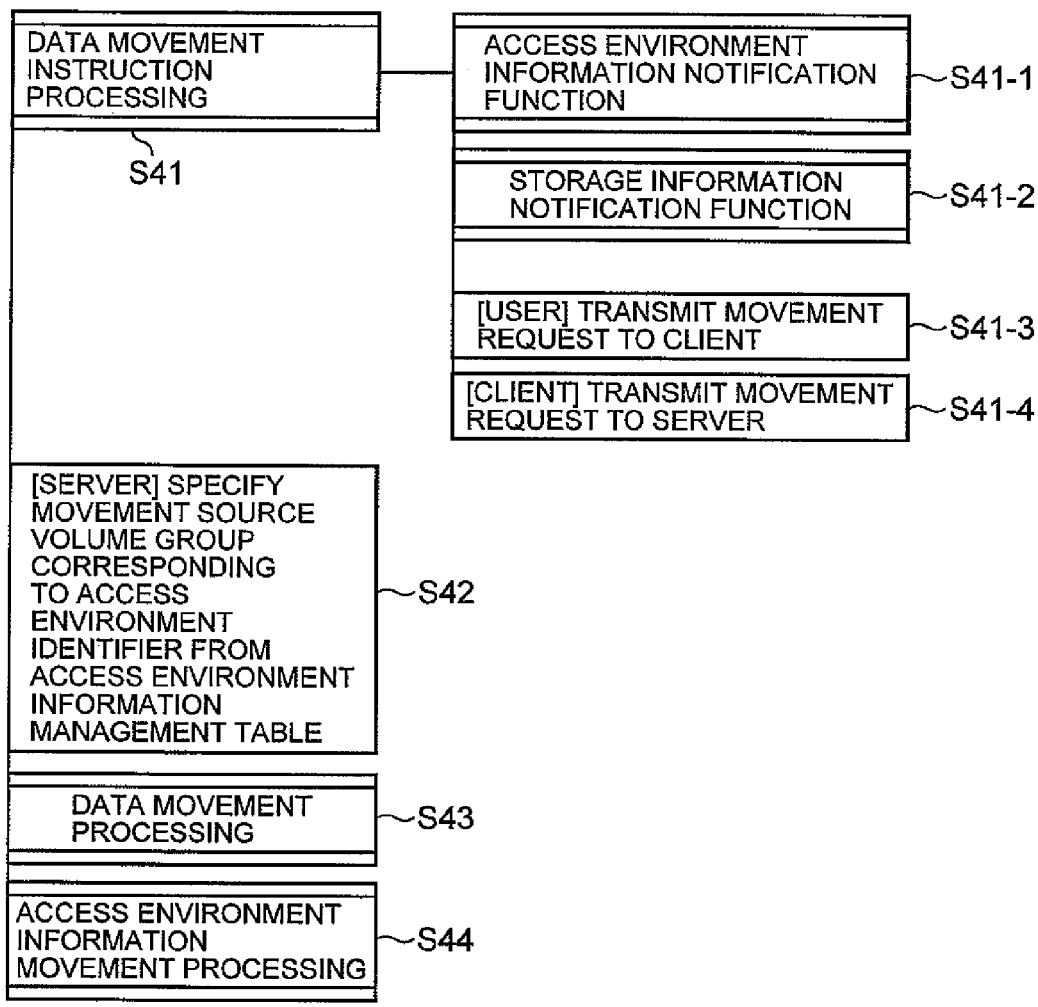
FIG. 12A shows an example of the flow of movement processing.

FIG. 12A shows an example of the flow of movement processing.

Step S41: data movement instruction processing is performed. More specifically, for example, access environment information notification processing such as that of the step S21 is performed (step S41-1), whereupon storage information notification processing (step S41-2) is performed. The management user is then able to issue a movement request (for example, a request including the access environment identifier and the identifier of each volume constituting the movement destination volume group) to the management client 7 (step S41-3). The client program 53 is able to transmit this request to the management server 3 (step S41-4).

Step S42: the server program 51 specifies a record containing the movement destination volume group included in the movement request from the management server 7 from the access environment information management table 61.

Data movement processing (S43) and access environment information movement processing (S44) are then performed.

Figure 12B:
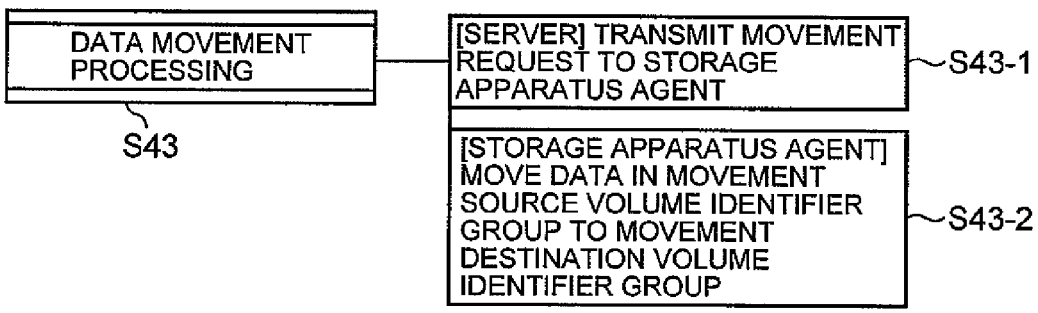
FIG. 12B shows an example of the flow of data movement processing.

FIG. 12B shows an example of the flow of the data movement processing.

Step S43-1: the server program 51 issues a data movement request (for example, the identifier of each movement source volume and the identifier of each movement destination volume) to the storage agent program 65. The identifiers of the movement source volumes may be volume identifiers corresponding to the access environment identifier included in the movement request, for example.

Step S43-2: the storage agent program 65 identifies the movement source volumes and movement destination volumes from the data movement request received from the server program 51, and moves the data in the movement source volumes to the movement destination volumes.

Figure 13:
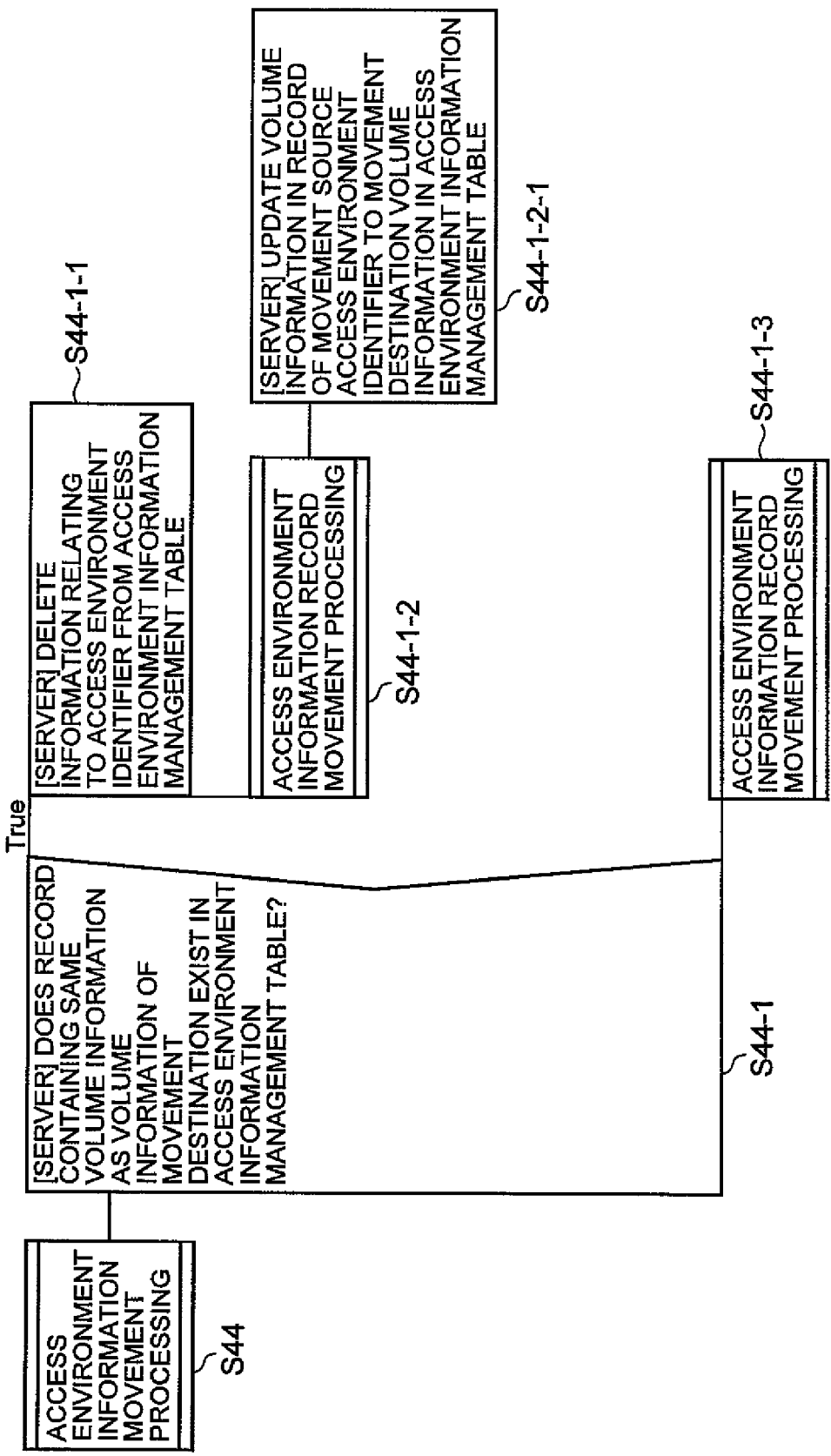
FIG. 13 shows an example of the flow of access environment information movement processing.

FIG. 13 shows an example of the flow of access environment information movement processing.

Step S44-1: the server program 51 determines whether or not a record containing the same volume information as the volume information included in the movement destination volume identifiers of the movement request exists in the access environment information management table 61.

Step S44-1-1: when an affirmative determination result is obtained in the step S44-1 (true in S44-1), the server program 51 deletes the aforementioned existing record from the access environment information table 61. Access environment information record movement processing (step S44-1-2) is then performed. Here, the server program 51 updates the unique access environment identifier denoting the movement source access environment information in the access environment information table 61 to a unique access environment identifier denoting the movement destination access environment information. In so doing, the access environment information is moved to the movement destination.

Step S44-1-3: when a negative determination result is obtained in the step S44-1, similar access environment information record movement processing to that of the step S44-1-2 is performed (step S44-1-3).

Figure 14:
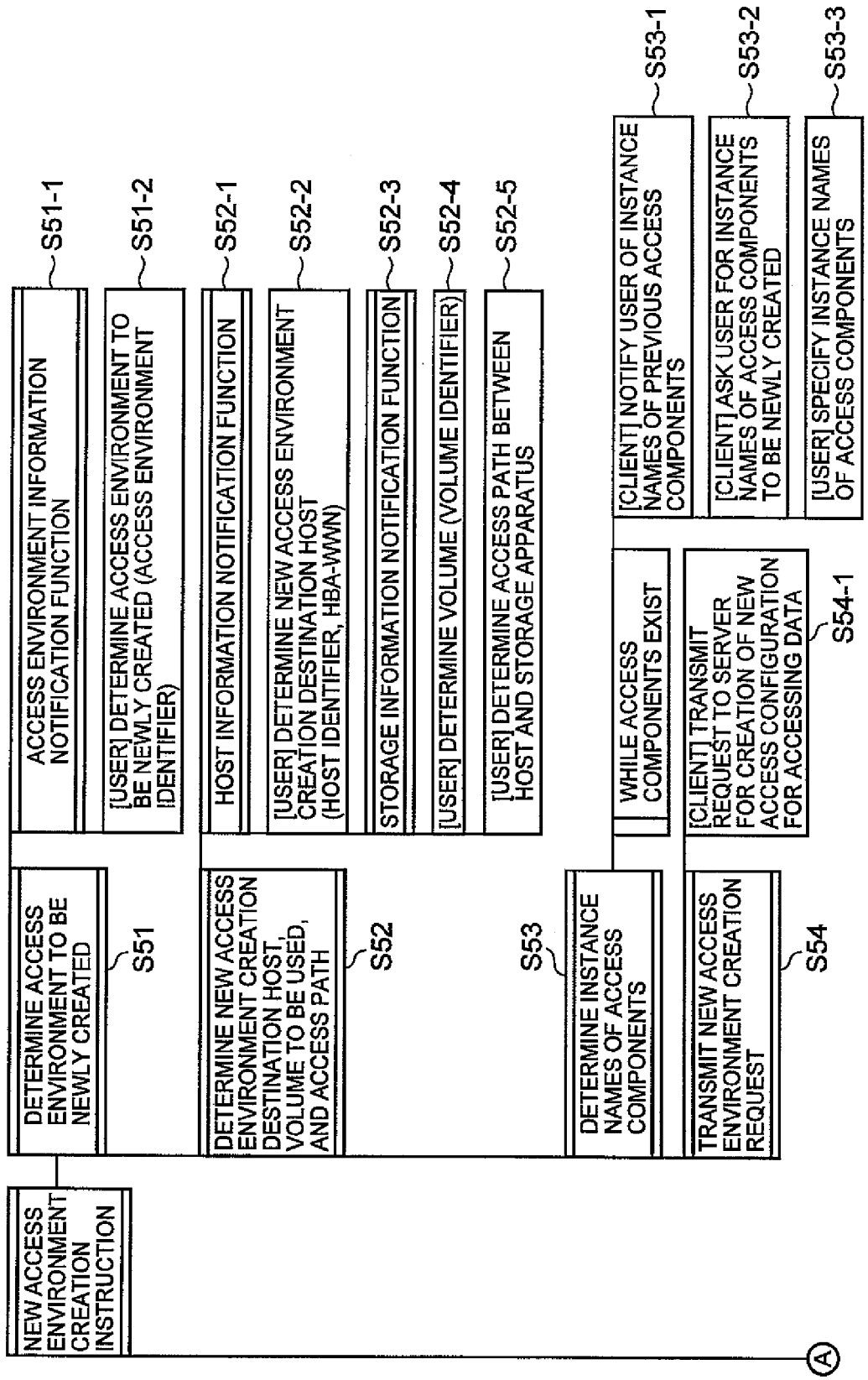
FIG. 14 shows an example of the flow of new access environment creation instruction processing within new access environment creation processing.

FIG. 14 shows an example of the flow of new access environment creation instruction processing within new access environment creation processing. Note that since an access environment already exists in the host 5A, as shown in FIG. 2, in the following description the host 5B is assumed to be the access environment creation destination.

New access environment creation processing is processing for creating the same access environment as the access environment used to access the data. In this processing, even when data are recorded in a volume, the data are deleted, for example.

Step S51: the access environment to be newly created is determined. More specifically, for example, access environment information notification processing such as that of FIG. 9A is performed (step S51-2), and thus the management user is able to determine the access environment to be newly created (by selecting the desired access environment information from the displayed list of access environment information, for example) (step S51-2).

Step S52: the host that is to serve as the creation destination of the determined access environment, the logical volume to be used, and an access path are determined. More specifically, for example, host information notification processing, to be described below, is performed (step S52-1). Using the plurality of host information obtained through this processing, the management user selects the host 5B as the host that is to server as the new creation destination (by determining information including the host identifier and HBA-WWN, for example) (step S52-2). Storage information notification processing, to be described below, is then performed (step S52-3). Using the volume information obtained through this processing, the management user determines the volume to be used and an access path from the host 5B to the storage system 9 (by selecting the volume identifier and CHA-Port, for example) (steps S52-4, S52-5).

Step S53: the instance names of the access components are determined. More specifically, for example, the client program 53 provides the management user with notification of the instance name for each access component of the access environment determined in the step S51-2 (step S53-1), and inquires about the new instance names (step S53-2). In response to this inquiry, the management user inputs the new instance names (step S53-3).

Step S54: a new access environment creation request is transmitted. More specifically, for example, the client program 53 transmits to the management server 3 a new creation request (for example, a request including the access environment identifier, host identifier, HBA-WWN, CHA-Port, volume identifier, and access component information) relating to the host 5B determined above (step S54-1).

Figure 15:
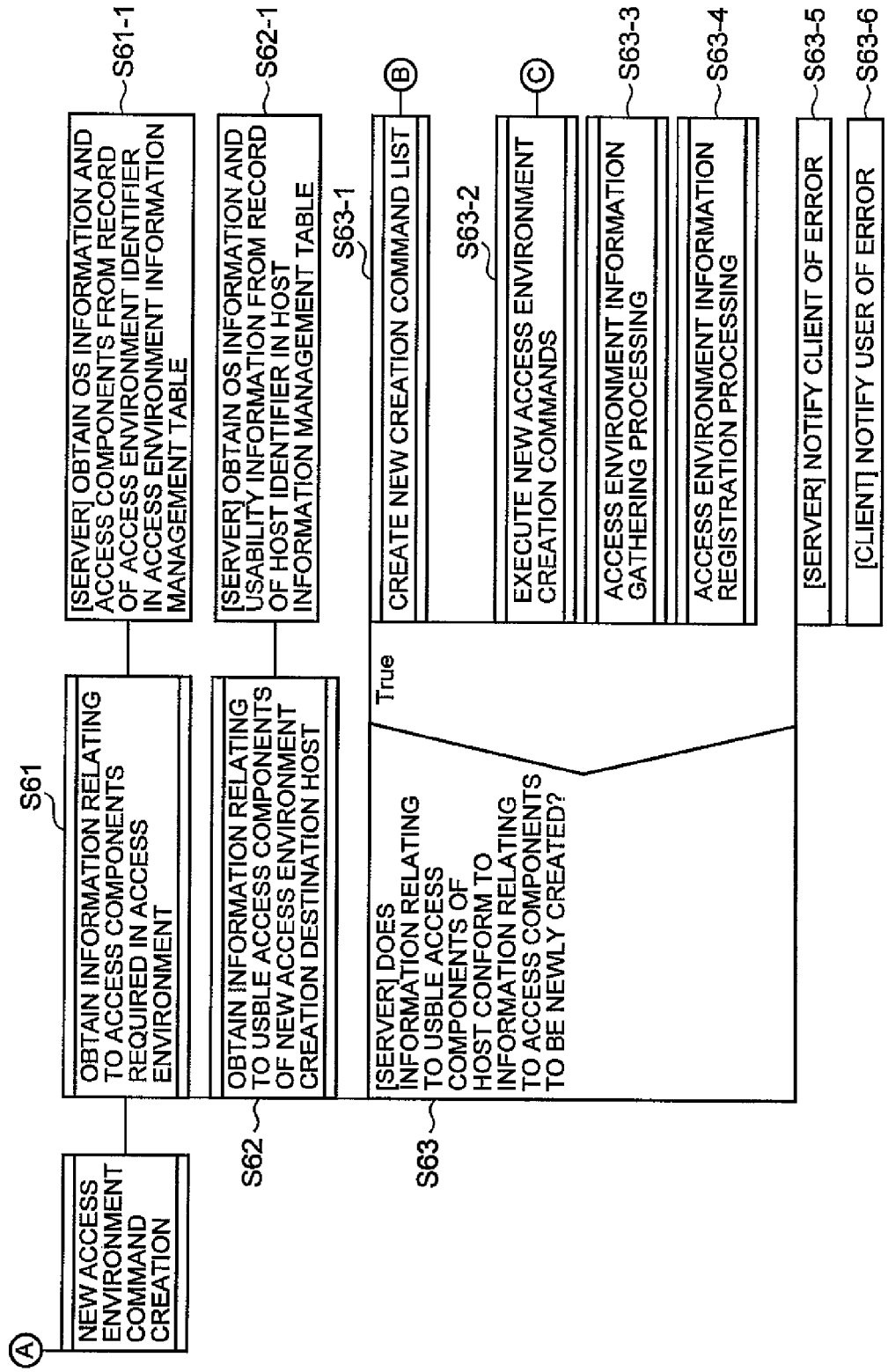
FIG. 15 shows a partial example of the flow of new access environment command creation processing within the new access environment creation processing.
Figure 16:
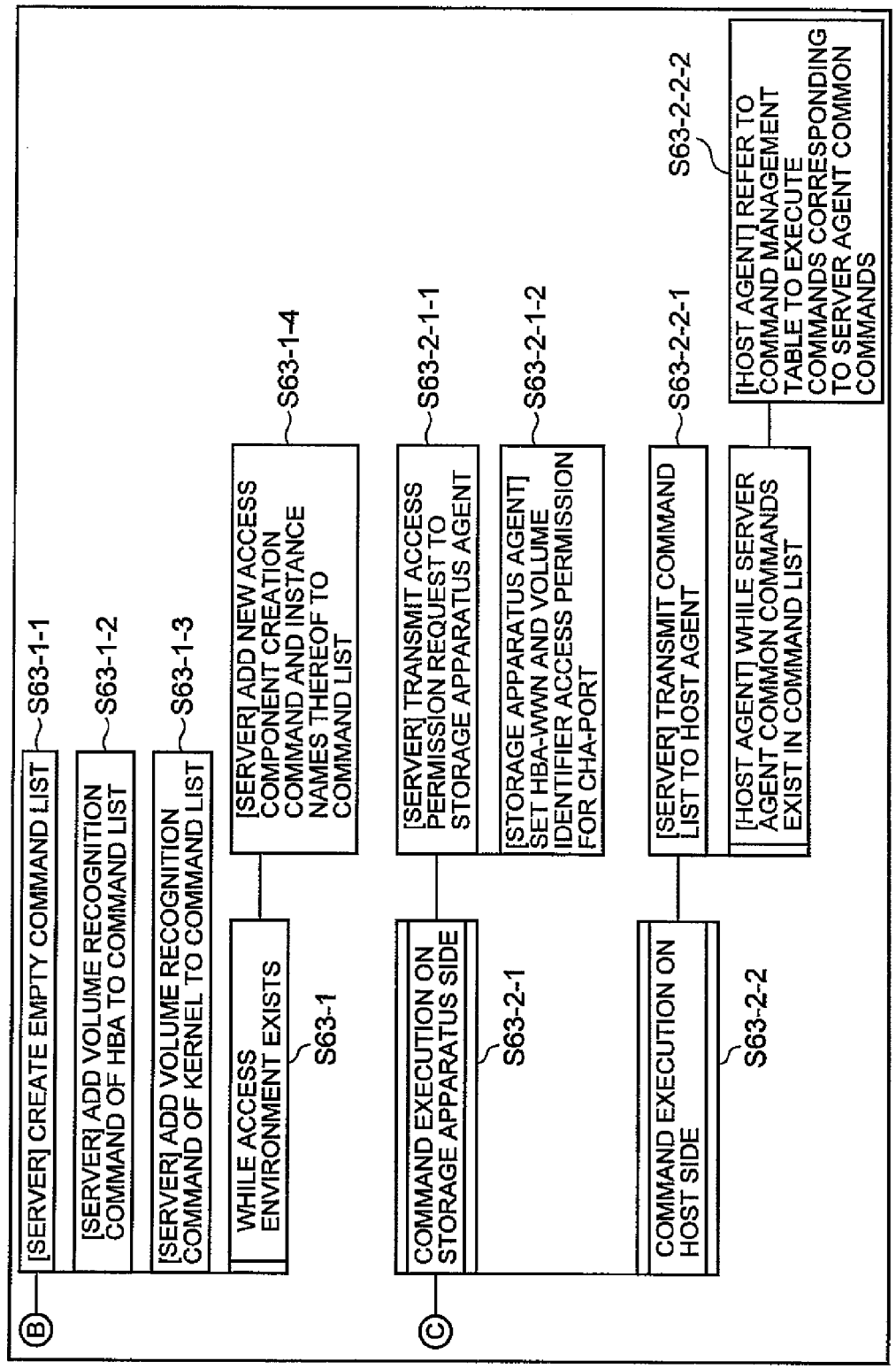
FIG. 16 shows the remainder of the example of the flow of the new access environment command creation processing.

FIG. 15 shows a partial example of the flow of new access environment command creation processing within the new access environment creation processing, and FIG. 16 shows the remainder of this example. This processing may be performed after the new creation instruction processing of FIG. 14.

Step S61: information regarding the access components required in the access environment is obtained. More specifically, for example, the server program 51 refers to the access environment information management table 61 to obtain OS information and access component information from a record containing the access environment identifier included in the new creation request received from the management client 7 (step S61-1).

Step S62: information regarding the access components that can be used by the new access environment creation destination host is obtained. More specifically, for example, the server program 51 refers to the host information management table 57 to obtain OS information and access component information from a record containing the host identifier included in the new creation request received from the management client 7 (step S62-1).

Step S63: the server program 51 determines whether or not the access environment to be newly created can be constructed in the new creation destination host. More specifically, for example, the server program 51 determines whether or not the OS information obtained in the step S61-1 conforms to the OS information obtained in the step S62-1, and whether or not the access component information obtained in the step S61-1 is included in the access component information obtained in the step S62-1.

Step S63-1: when an affirmative determination result is obtained in the step S63, processing for creating a new command list is performed. More specifically, for example, the server program 51 prepares an empty command list in the memory (step S63-1-1), adds the volume recognition command of the HBA to the command list (step S63-1-2), and then adds the volume recognition command of the kernel to the command list (step S63-1-3). The server program 51 then adds to the command list a new creation command and an instance name for each access component (the instance names included in the access component information obtained in the step S61-1) of the access environment to be newly created in accordance with the configuration sequence written in the access environment information (step S63-1-4). In other words, a plurality of server agent common commands is written into the command list in order of the access components to be used to construct the access environment.

Step S63-2: new access environment creation command execution processing is performed. For example, command execution processing in the storage system 9 (step S63-2-1) and command execution processing in the host 5B (step S63-2-2) are performed.

In the command execution processing of the storage system 9, the server program 51 transmits an access permission request to the storage agent program 65 (a request including the HBA-WWN, CHA-Port, and volume identifier included in the new creation request from the management client 7) (step S63-2-1-1). Then, in accordance with the access permission request, the storage agent program 65 sets the HBA-WWN and volume identifier as access-permitted subjects in relation to the CHA-Port specified in the request (step S63-2-1-2).

In the command execution processing of the host 5B, the server program 51 transmits the command list to the host agent program 39B of the host 5B (step S63-2-2-1). The host agent program 39B reads the server agent common commands written in the received command list, extracts the information corresponding to the read server agent common commands from the command management table 35B, and performs processing corresponding to the extracted information (step S63-2-2-2). The step S63-2-2-2 is repeated at least until all of the server agent common commands have been read from the command list and executed. The server agent common commands are arranged in the command list such that the access components are associated with each other in the access environment configuration sequence, and therefore, by repeating the step S63-2-2-2, the access environment to be newly created can be constructed in the host 5B.

Step S63-3: access environment information gathering processing such as that of the step S1 in FIG. 7 is performed.

Step S63-4: access environment information registration processing such as that of the step S2 in FIG. 7 is performed.

Step S63-5: when a negative determination result is obtained in the step S63, the server program 51 provides the management client 7 with notification of an error.

Step S63-6: the client program 53 notifies the management user of the error received from the management server 3.

Figure 17:
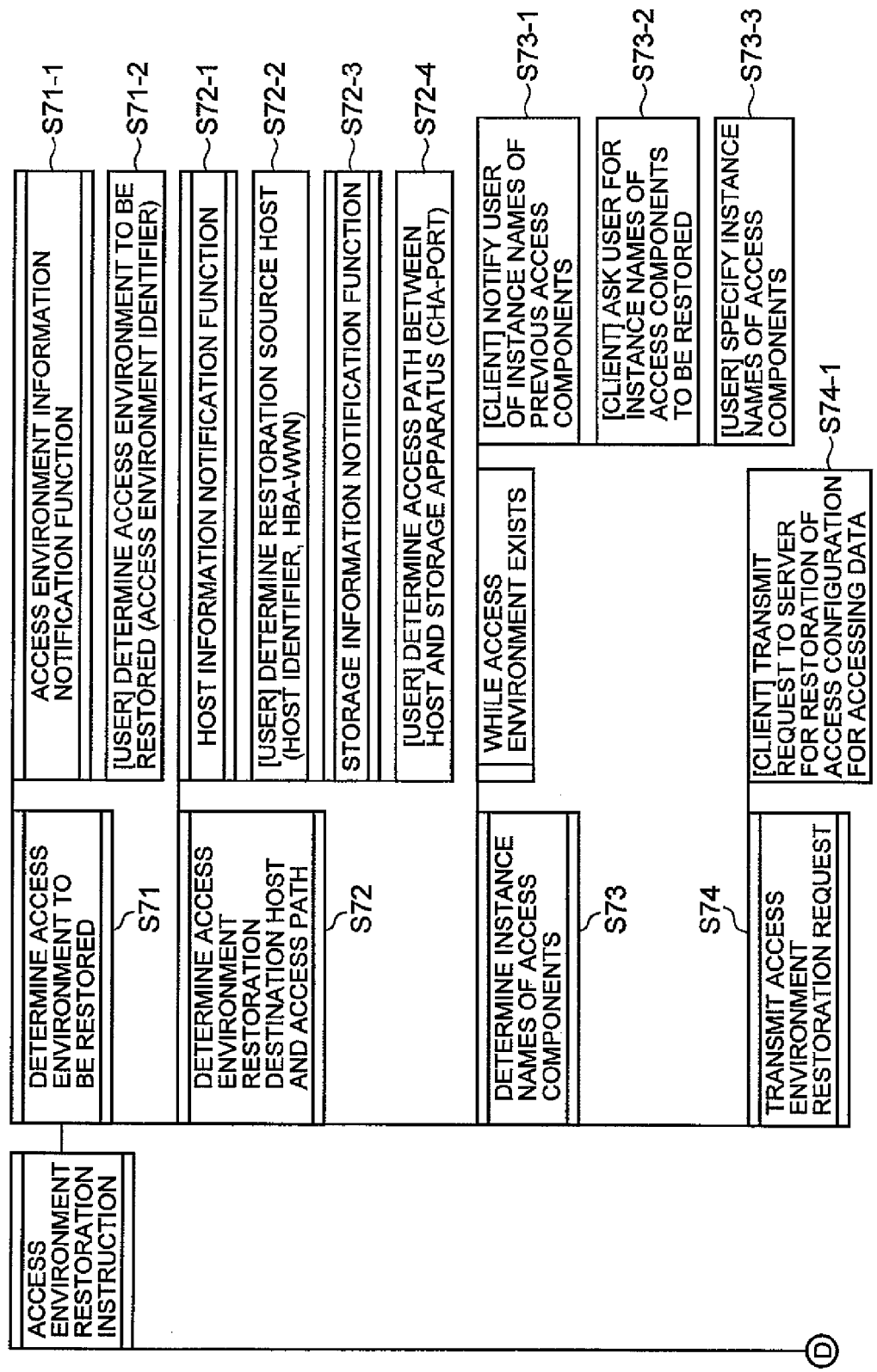
FIG. 17 shows an example of the flow of access environment restoration instruction processing within access environment restoration processing.

FIG. 17 shows an example of the flow of access environment restoration instruction processing within access environment restoration processing. Note that since an access environment already exists in the host 5A, as shown in FIG. 2, in the following description the host 5B is assumed to be the access environment restoration destination.

Access environment restoration processing is processing for restoring the access environment used to access data on the basis of the access environment information that is associated with the volume group in which the data are stored. By means of this processing, the restored data can be accessed by the other AP 31B.

Step S71: the access environment to be restored is determined. More specifically, for example, access environment information notification processing such as that shown in FIG. 9A is performed (step S71-2), and thus the management user is able to determine the access environment to be restored (by selecting the access environment information that corresponds to the desired volume identifier from the displayed list of access environment information, for example (step S71-2).

Similar processing to that of the above steps S52 (steps S52-1 to S52-4) and S53 (steps S53-1 to S53-3) is then performed (step S72 (steps S72-1 to S72-4), step S73 (steps S73-1 to S73-3)).

Step S74: an access environment restoration request is transmitted. More specifically, for example, the client program 53 transmits a restoration request (for example, a request including the access environment identifier, host identifier, HBA-WWN, CHA-Port, volume identifier, and access component information) to the management server 3 in relation to the host 5B determined as the restoration destination (step S74-1).

Figure 18:
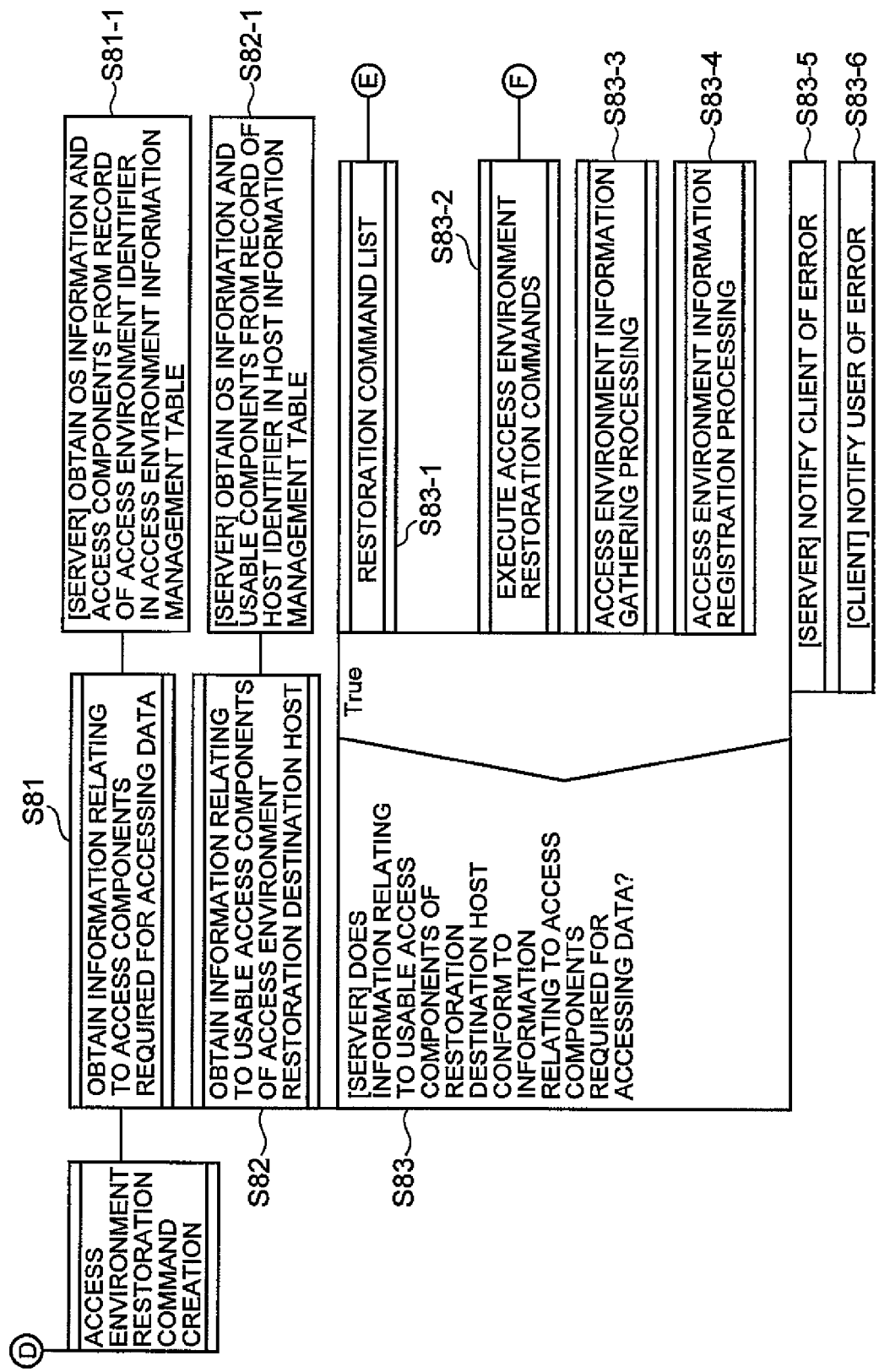
FIG. 18 shows a partial example of the flow of access environment restoration command creation processing within the access environment restoration processing.

FIG. 18 shows a partial example of the flow of access environment restoration command creation processing within the access environment restoration processing, and FIG. 19 shows the remainder thereof. This processing may be performed after the restoration instruction processing of FIG. 17.

Similar processing to that of the step S61 (step S61-1) and S62 (step S62-1) of FIG. 15 is performed on the basis of the restoration request from the management client 7 (steps S81 (step S81-1) and S82 (step S82-1)).

Step S83: the server program 51 determines whether or not the access environment to be restored can be constructed in the restoration destination host. More specifically, for example, the server program 51 determines whether or not the OS information obtained in the step S81-1 conforms to the OS information obtained in the step S82-1, and whether or not the access component information obtained in the step S81-1 is included in the access component information obtained in the step S82-1.

Step S83-1: when an affirmative determination result is obtained in the step S83, restoration command list creation processing is performed. More specifically, for example, similar processing to that of the steps S63-1-1 to S63-1-4 is performed (steps S83-1-1 to S83-1-4).

Step S83-2: access environment restoration command execution processing is performed. For example, command execution processing in the storage system 9 (step S83-2-1) and command execution processing in the host 5B (step S83-2-2) are performed. In the command execution processing of the storage system 9, similar processing to that of the steps S63-2-1-1 to S63-2-1-2 is performed (step S83-2-1-1 to S83-2-1-2). In the command execution processing of the host 5B, similar processing to that of the steps S63-2-2-1 to S63-2-2-2 is performed (step S83-2-2-1 to S83-2-2-2). As a result, the restoration subject access environment is restored in the host 5B.

Step S83-3: access environment information gathering processing such as that of the step S1 in FIG. 7 is performed.

Step S83-4: access environment information registration processing such as that of the step S2 in FIG. 7 is performed.

Step S83-5: when a negative determination result is obtained in the step S83, the server program 51 provides the management client 7 with notification of an error.

Step S83-6: the client program 53 notifies the management user of the error received from the management server 3.

An example of the flow of restoration processing was described above. Note that in order to perform this restoration processing, the following conditions (A) to (D) must be satisfied.

(A) The access component management manager must possess a function for modifying the configuration information (metadata, for example) of the access components.
(B) The access component management manager must possess a function for generating instances on the basis of the modified configuration information of the access components.
(C) The access component management manager must possess means for placing the instances of the access components under its own management.
(D) The location of the access component configuration information within the host agent program-executed procedure of the command management table must be known, and during restoration, the procedure must be stored after learning the configuration information modification method.

Figure 20A:
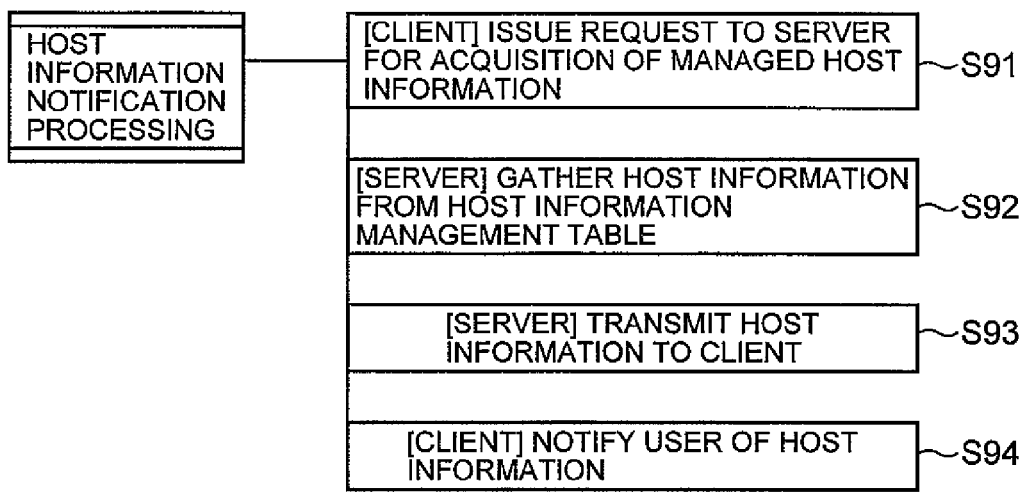
FIG. 20A shows an example of the flow of host information notification processing.

FIG. 20A shows an example of the flow of host information notification processing.

Step S91: the client program 53 issues the management server 3 with a request for acquisition of the host information that is under the management of the management server 3.

Step S92: the server program 51 gathers the host information written in the host information management table 57.

Step S93: the server program 51 transmits the gathered host information to the management client 7.

Step S94: the client program 53 displays the host information received from the management server 3 to the management user.

Figure 20B:
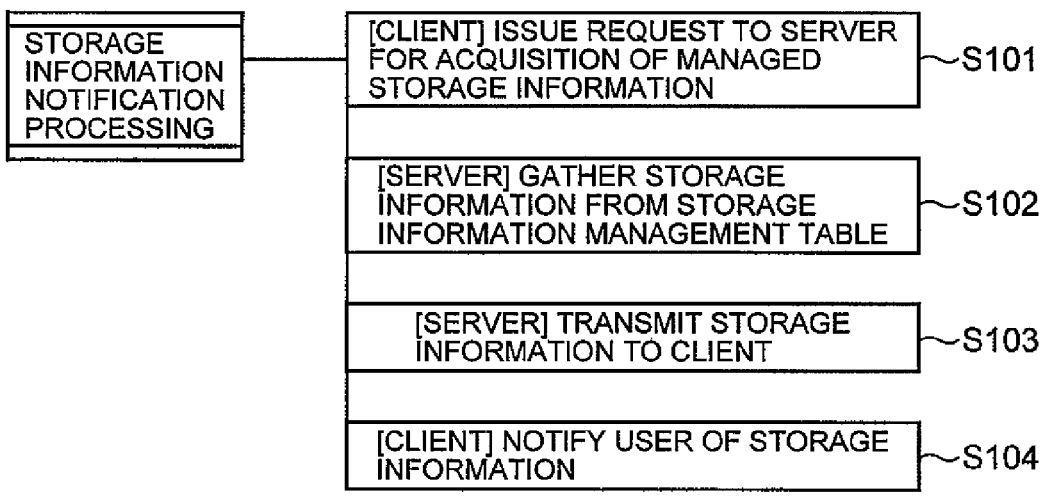
FIG. 20B shows an example of the flow of storage information notification processing.

FIG. 20B shows an example of the flow of storage information notification processing.

Step S101: the client program 53 issues the management server 3 with a request for acquisition of the storage information that is under the management of the management server 3.

Step S102: the server program 51 gathers the storage information written in the storage information management table 63.

Step S103: the server program 51 transmits the gathered storage information to the management client 7.

Step S104: the client program 53 displays the storage information received from the management server 3 to the management user.

This ends the description of this embodiment.

In the embodiment described above, there is no need to manage the metadata of the access components, and therefore the rewriting procedure of the metadata can be managed. Management of the metadata themselves can be incorporated into management of the access components.

More specifically, for example, the logical volume manager is capable of writing the metadata of the LV management module, which serve as the instance thereof, into a logical volume. To enable data access in this embodiment, the management server 3 does not manage the metadata, but instead is capable of managing information indicating that the LV management module of the logical volume manager is in use as an access component. Further, the host agent program or storage agent program is capable of managing information such as "where are the metadata of the LV management module in the logical volume manager located?" or "what procedure should be used to restore the metadata so that the logical volume can be restored?", for example. The metadata can be rewritten by executing the procedure for providing the access component.

In other words, according to the embodiment described above, environment information required for accessing data (for example, the combination and sequence of access components, and the volume in which the data are stored) can be managed instead of metadata. In so doing, the access environment for accessing the data can be constructed at an arbitrary timing, without having to be maintained.

Also according to the embodiment described above, the access environment information is managed in association with the data such that when the data are coped or moved, the access environment information that was associated with the copied or moved data is related to the data in the copy destination or movement destination. As a result, an environment for accessing the data in the copy destination or movement destination can be constructed.

Also according to this embodiment, a list of server agent common commands is created on the basis of the access environment information, and the access environment is constructed in accordance with the commands on the list. As a result, a management user or host user can construct the access environment without knowing the unique set operations required to construct the access environment. The access configuration required to access the data can thus be restored.

A preferred embodiment of the present invention was described above, but this embodiment is merely an example used to describe the present invention, and the scope of the present invention is not limited to this embodiment alone. The present invention may be implemented in various other aspects.

For example, the command management table may be provided in the management server 3 instead of, or as well as, in the host, and instructions may be issued to the host agent program directly on the basis of this command management table.

Further, for example, the functions of the management client 7 may be incorporated into the management server 3. Moreover, the functions of the management client 7 and/or the management server 3 may be incorporated into the host 5A, 5B, . . . .

Further, for example, instead of, or in addition to, copying and/or moving data within the storage system 9, data may be copied and/or moved from the storage system 9 to another storage system not shown in the drawing.

Further, for example, in the access environment restoration command creation processing illustrated in FIGS. 18 and 19, the server program 51 may obtain application information corresponding to the obtained access component information in the step S81-1. Further, in the step S83-2-2-1, the server program 51 may create a command list for restoring the access environment and transmit this command list to the application program indicated by the obtained application information. Thus, when the step S83-2-2 is performed, the access environment can be restored to the application program indicated by the application information, from among the plurality of application programs in the restoration destination host 5B. As a result, the application program indicated by the application information becomes capable of accessing the data in the copy destination or movement destination under the restored access environment.

What is claimed is:

1. A computer system comprising:
a storage system including a first volume and a second volume;
a first host computer coupled to the storage system, which executes a first application program, a first access environment program, and access environment information indicating a configuration of the first access environment program;
a second host computer coupled to the storage system; and
a management computer coupled to the storage system and the first host computer and the second host computer,
wherein the first access environment program converts an application data created by the first application program, according to the access environment information, and sends the converted application data to the first volume,
wherein the storage system copies data stored in the first volume to the second volume,
wherein the management computer stores the access environment information, and relationship between the second volume and the access environment information,
wherein, when the management computer receives a request to access the second volume from the second host computer, the management computer identifies the access environment information based on the relationship, and sends the access environment information to the second host computer, and
wherein the second host computer configures a second access environment program stored in the second host computer based on the access environment information, and
wherein a second application program is stored on the second host computer, and accesses the second volume via the second access environment program configured by the access environment information.

2. A computer system according to claim 1,
wherein the second host computer installs the second access environment program before receiving the request to access the second volume from the second host computer.

3. A computer system according to claim 1,
wherein the second host computer installs the second access environment program according to reception of the request to access the second volume from the second host computer.

4. A data managing method in a computer system including a first host computer, a second host computer, a storage system, and a management computer, comprising:
by a storage system, configuring a first volume and a second volume;
by the first host computer, installing a first application program and a first access environment program;
by the first host computer, storing access environment information indicating a configuration of the first access environment program;
by the first application program, generating an application data;
by the first access environment program, converting the application data according to the access environment information, and sending the converted application data to the first volume;
by the storage system, copying data stored in the first volume to the second volume;
by the management computer, storing the access environment information, and relationship between the second volume and the access environment information;
when the management computer receives a request to access the second volume from the second host computer, by the management computer, identifying the access environment information based on the relationship, and sends the access environment information to the second host computer; and
by the second host computer, configuring an second access environment program installed to the second host computer, based on the access environment information; and
by a second application program installed on the second host computer, accessing the second volume via the second access environment program configured by the access environment information.

5. A data managing method according to claim 4,
wherein the second host computer installs the second access environment program before receiving the request to access the second volume from the second host computer.

6. A data managing method according to claim 4,
wherein the second host computer installs the second access environment program according to reception of the request to access the second volume from the second host computer.

* * * * *